US008498394B2

(12) United States Patent
Kagawa et al.

(10) Patent No.: US 8,498,394 B2
(45) Date of Patent: Jul. 30, 2013

(54) ANONYMOUS COMMUNICATION SYSTEM

(75) Inventors: Natsuko Kagawa, Tokyo (JP); Takeaki Minamizawa, Tokyo (JP)

(73) Assignee: NEC Corporation, Tokyo (JP)

( * ) Notice: Subject to any disclaimer, the term of this patent is extended or adjusted under 35 U.S.C. 154(b) by 153 days.

(21) Appl. No.: 13/056,265

(22) PCT Filed: Jul. 31, 2009

(86) PCT No.: PCT/JP2009/063640
§ 371 (c)(1),
(2), (4) Date: Apr. 13, 2011

(87) PCT Pub. No.: WO2010/013804
PCT Pub. Date: Feb. 4, 2010

(65) Prior Publication Data
US 2011/0228920 A1    Sep. 22, 2011

(30) Foreign Application Priority Data
Jul. 31, 2008    (JP) ................................. 2008-197946

(51) Int. Cl.
*H04M 3/42* (2006.01)
*H04M 1/56* (2006.01)
*H04M 15/06* (2006.01)

(52) U.S. Cl.
USPC ............. 379/201.11; 379/142.02; 379/142.04

(58) Field of Classification Search
USPC ............. 379/201.11, 201.01, 207.15, 142.01, 379/142.02, 142.04; 709/204
See application file for complete search history.

(56) References Cited

U.S. PATENT DOCUMENTS
2005/0246419 A1* 11/2005 Jaatinen ......................... 709/204
2008/0025488 A1*  1/2008 Dean et al. ............... 379/201.11

FOREIGN PATENT DOCUMENTS
JP    2008028847 A    2/2008

OTHER PUBLICATIONS
International Search Report for PCT/JP2009/063640 mailed Oct. 27, 2009.
Nippon Telegraph and Telephone West Corporation, "Voice over IP communication network service", Version 3.0, Feb. 1, 2007, Number Display, [retrieved on Jul. 25, 2008], Retrieved form the Internet <URL:http:// www.ntt-west.co.jp/flets/hikaridenwa_office/download/hikari_office3.0.pdf>.
Nippon Telegraph and Telephone West Corporation, "Specific Number notification service", [retrieved on Jul. 25, 2008]; Retrieved form the Internet <URL:http://www.ntt-west.co.jp/flets/hikaridenwa_office/service/bangoutuuchi/index.html>.
N. Taniguchi et al., "A Note on Anonymity/Pseudonymity/Identity Management of Decentralized Identity Escrow", IEICE Technical Report, SITE2005-53, The Institute of Electronics, Information and Communication Engineers, 2006, pp. 7-12.
A. Pfitzmann et al., "Anonymity, Unlinkability, Undetectability, Unobservability, Pseudonymity, and Identity Management—A Consolidated Proposal for Terminology", Feb. 15, 2008, [retrieved on Jul. 25, 2008] Retrieved form the Internet <URL: http://dud.inf.tu-dresden.de/literatur/Anon_Terminology_v0.31.pdf.
Wikipedia, the free encyclopedia, "Anonymity", [retrieved on Jul. 25, 2003], Retrieved form the Internet URL:http://ja.wikipedia.org/wiki/%E5%8C%BF%E5%90%8D#.E9.96.A2.E9.80.A3.E9.A0.85.E7.9B AE>.

* cited by examiner

*Primary Examiner* — Thjuan K Addy

(57) ABSTRACT

An anonymous communication system allows a third party, which is not a communicating party, to determine the anonymities of the communicating parties. An anonymity notifying apparatus to be installed in an anonymous communication system enables anonymous communication. An anonymous communication system and method detects the anonymities of communication parties and notifies them to a third party device other than communication devices of the communication parties.

19 Claims, 15 Drawing Sheets

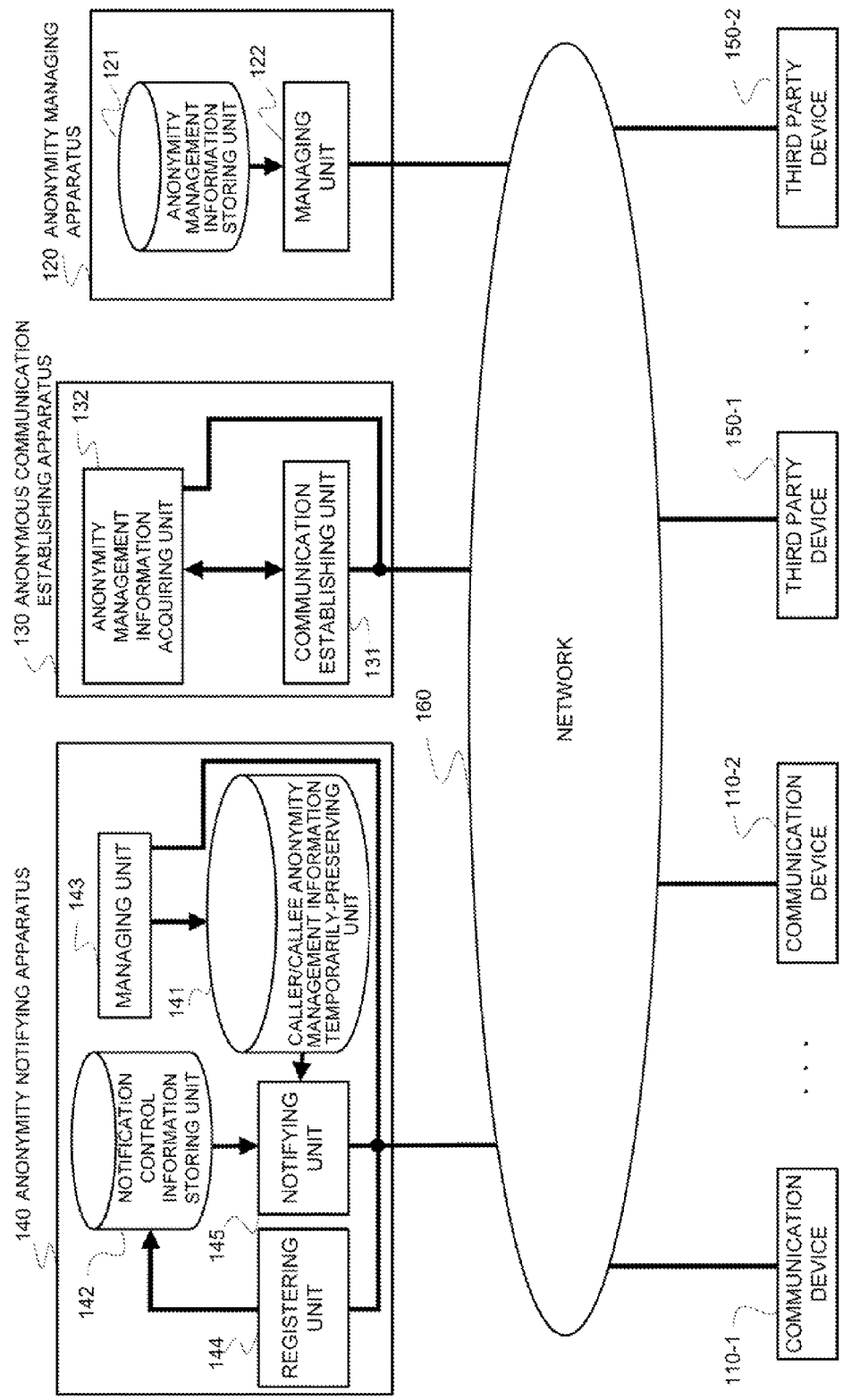

FIG. 2

121 ANONYMITY MANAGEMENT INFORMATION STORING UNIT

| REAL ADDRESS | ANONYMOUS ADDRESS | ANONYMITY |
|---|---|---|
| sip:101@example.com | sip:anonym-1-1@example.com | Unlinkability Undeniability |
| sip:201@example.com | sip:anonym-2-1@example.com | Unlinkability Undeniability |
| ⋮ | ⋮ | ⋮ |

FIG. 3

141 CALLER/CALLEE ANONYMITY MANAGEMENT INFORMATION TEMPORARILY-PRESERVING UNIT

| IDEN-TIFIER | CALLER ANONYMITY MANAGEMENT INFORMATION | | | CALLEE ANONYMITY MANAGEMENT INFORMATION | | |
|---|---|---|---|---|---|---|
| | REAL ADDRESS | ANONYMOUS ADDRESS | ANONYMITY | REAL ADDRESS | ANONYMOUS ADDRESS | ANONYMITY |
| ID001 | sip:101@example.com | sip:anonym-1-1@example.com | Unlinkability Undeniability | sip:201@example.com | sip:anonym-2-1@example.com | Unlinkability Undeniability |
| ⋮ | ⋮ | ⋮ | ⋮ | ⋮ | ⋮ | ⋮ |

FIG. 4

142 NOTIFICATION CONTROL INFORMATION STORING UNIT

| REGISTRATION NUMBER | DESIGNATION INFORMATION OF COMMUNICATION DEVICE, BEING MONITORING TARGET | DESIGNATION INFORMATION OF THIRD PARTY DEVICE TO WHICH ANONYMITY IS NOTIFIED | DESIGNATION INFORMATION OF COMMUNICATION PARTY, BEING NOTIFICATION TARGET OF ANONYMITY | NOTIFICATION CONDITION |
|---|---|---|---|---|
| x001 | sip:101@example.com | sip:301@example.com | CALLER DEVICE CALLEE DEVICE | WITH CASE OF CALLER |
| ⋮ | ⋮ | ⋮ | ⋮ | ⋮ |

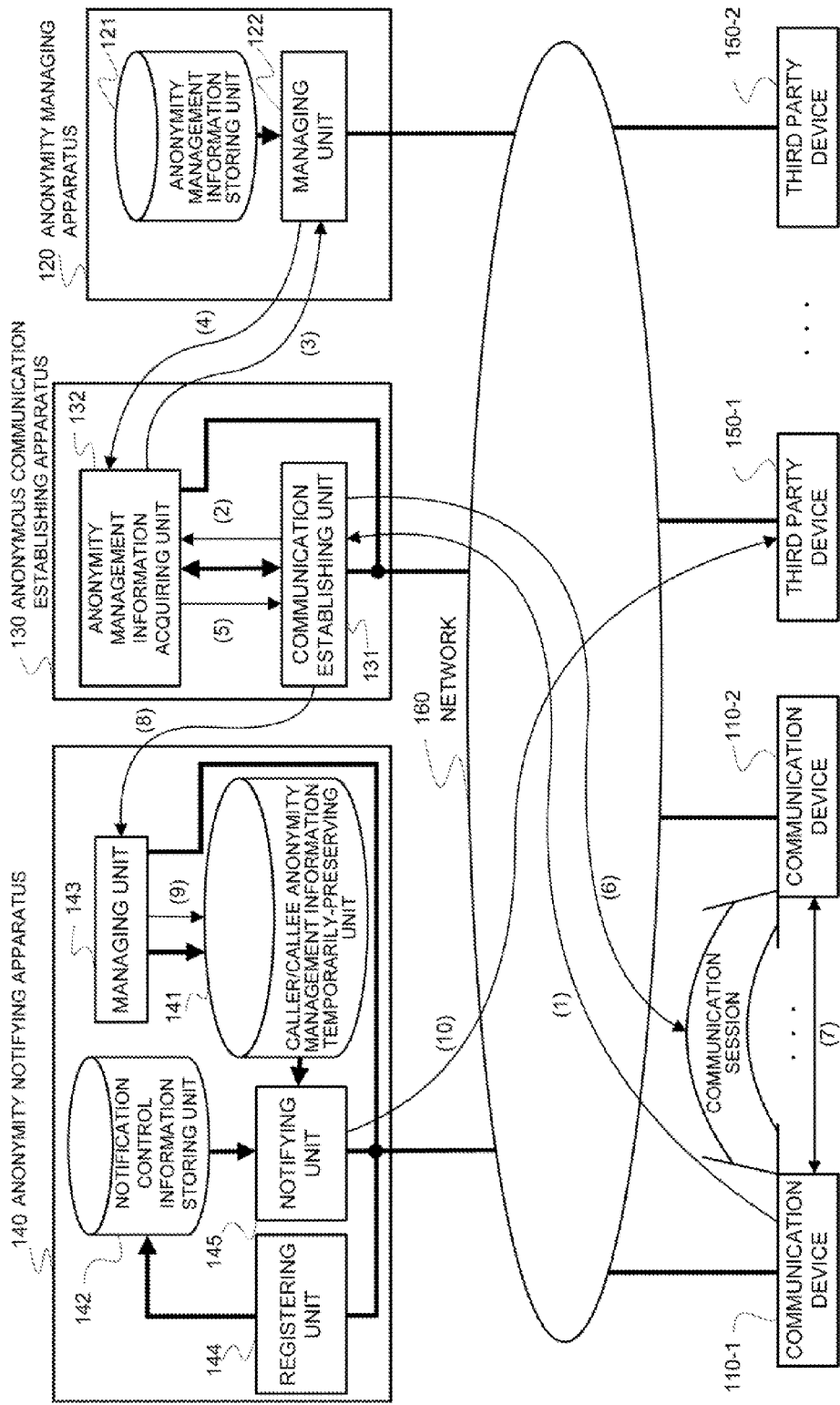

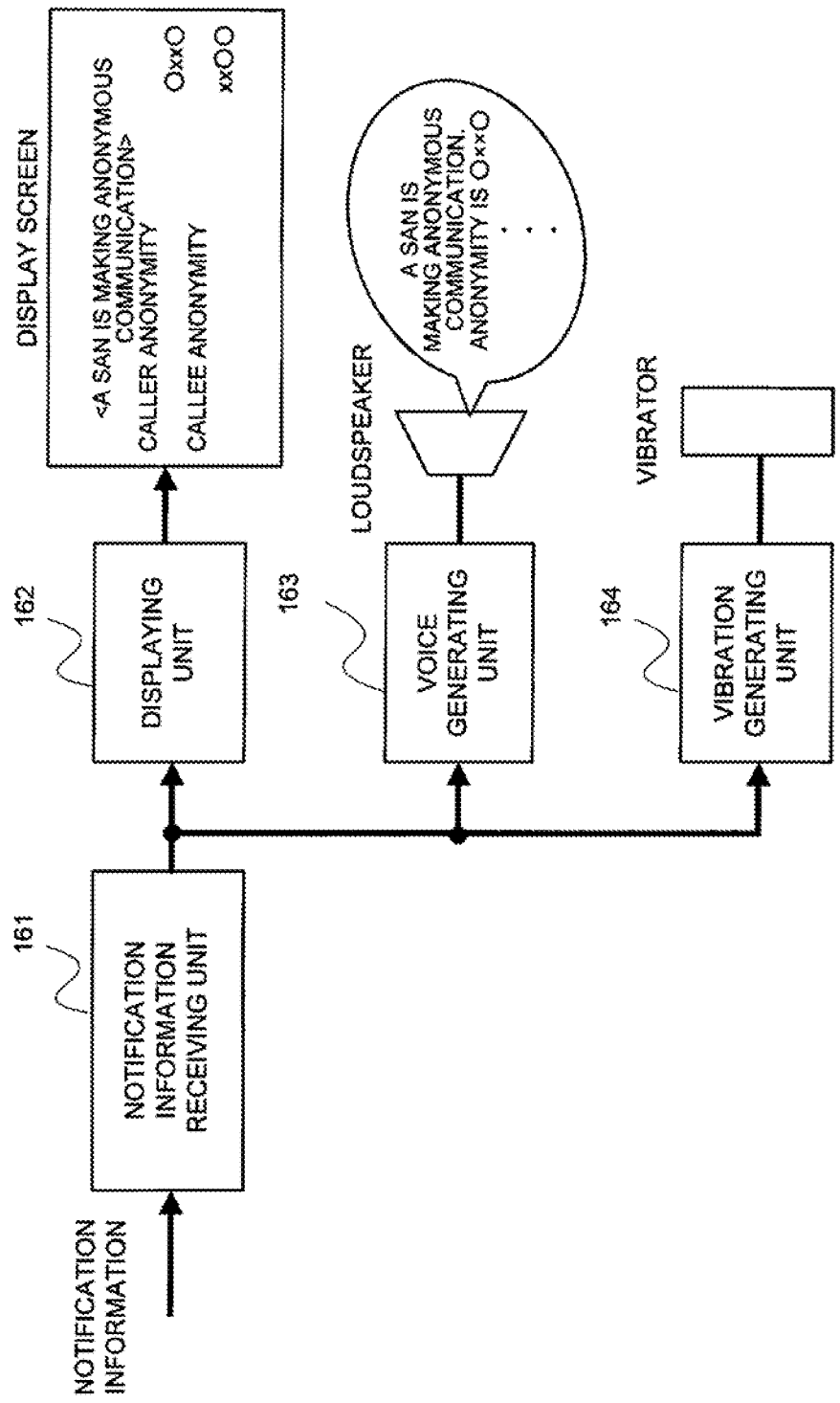

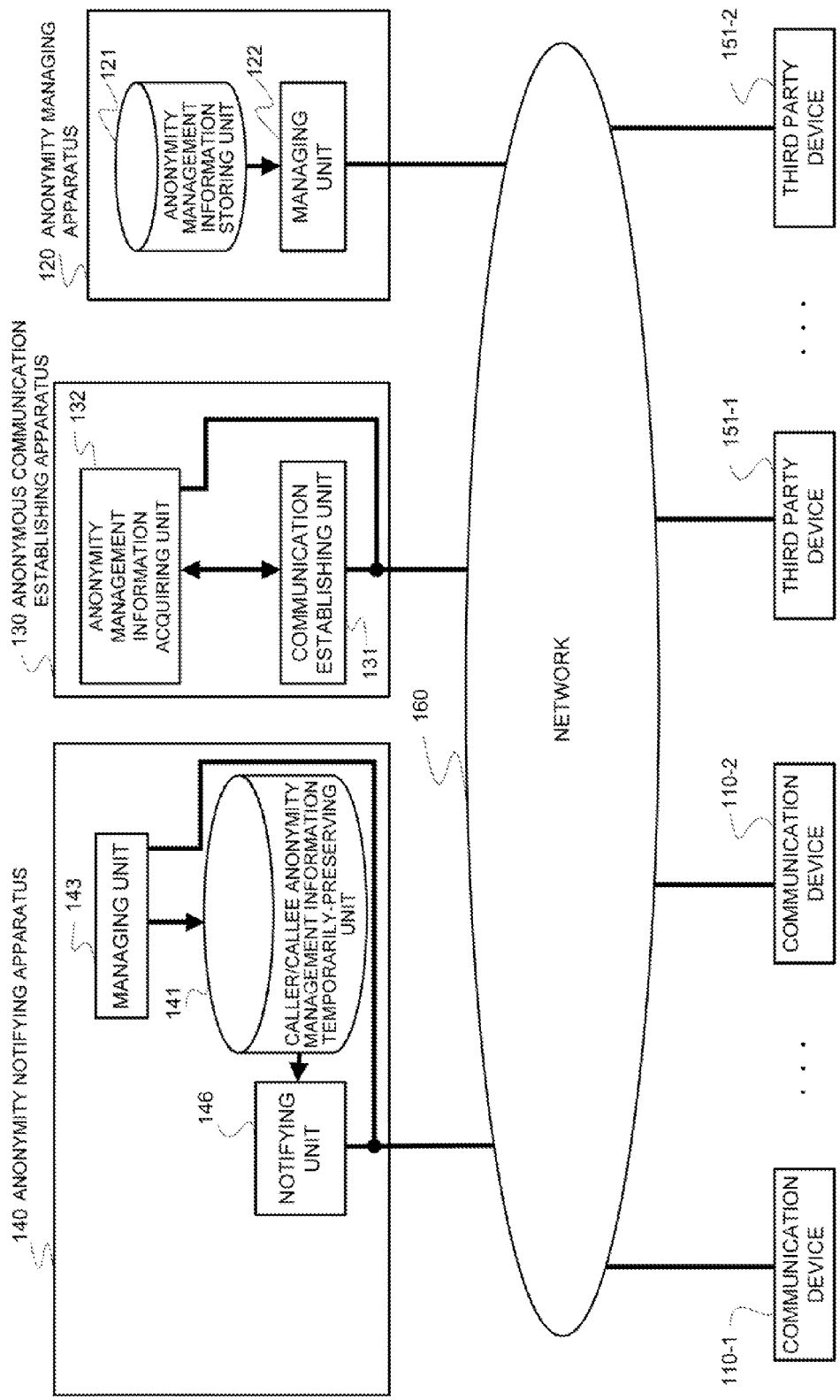

FIG. 8

ANONYMITY NOTIFICATION REQUEST (a)

| DESIGNATION INFORMATION OF COMMUNICATION DEVICE, BEING MONITORING TARGET | DESIGNATION INFORMATION OF THIRD PARTY DEVICE TO WHICH ANONYMITY IS NOTIFIED | DESIGNATION INFORMATION OF COMMUNICATION PARTY, BEING NOTIFICATION TARGET OF ANONYMITY | NOTIFICATION CONDITION |
|---|---|---|---|

(b)

| sip:101@example.com | sip:301@example.com | CALLER DEVICE CALLEE DEVICE | WITH CASE OF CALLER |
|---|---|---|---|

FIG. 15

14A USER ATTRIBUTE STORING UNIT

| REAL ADDRESSES OF COMMUNICATION DEVICE | AGE OF USER |
|---|---|
| sip:101@example.com | 20 |
| sip:201@example.com | 12 |
| ⋮ | ⋮ |

FIG. 16

14B INQUIRY CONDITION STORING UNIT

| INQUIRY THRESHOLD |
|---|
| THIRTEEN YEARS OLD OR MORE |

ANONYMOUS COMMUNICATION SYSTEM

This application is the National Phase of PCT/JP2009/063640, filed Jul. 31, 2009 which is based upon and claims the benefit of priority from Japanese patent application No. 2008-197946, filed on Jul. 31, 2008, the disclosure of which is incorporated herein in its entirety by reference.

TECHNICAL FIELD

The present invention relates to an anonymous communication system enabling an anonymous communication, and particularly an anonymous communication system that enables a third party to confirm anonymities of the anonymous communication.

BACKGROUND ART

The so-called anonymous communication is a communication to be performed in a situation in which a caller does not reveal identification information for specifying itself to the communication partner. As one example, there exists a caller number notification/non-notification service by an IP communication network using voice described in Non-patent literature 1. In this caller number notification/non-notification service, adopting the caller number non-notification as a default setting at the time of a contract, or affixing "184" to the head of a destination telephone number and dialing up with the caller device, for example, in a telephone network of Japan, instead of making such a setting, makes it possible to perform a communication of not notifying a telephone number of a caller device to a callee device, namely, the anonymous communication. Further, adopting the caller number notification as the default setting at the time of a contract, or affixing "186" to the head of a destination telephone number and dialing up with the caller device, for example, in a telephone network of Japan, instead of making such a setting, makes it possible to notify a telephone number of the caller device to the callee device.

Further, the specific number notification service described in Non-patent literature 2 is also one kind of the anonymous communications. In this specific number notification service, when the caller becomes a contractor of the specific number notification service, not a separate telephone number of the caller device but a receiving charge telephone number (one kind of representative numbers) contracted by the caller can be notified to the callee device.

CITATION LIST

Non Patent Literature

[NPL 1] NIPPON TELEGRAM AND TELEPHONE WEST CORPORATION, "IP Communication Network Service Using Voice", Edition 3.0, Feb. 1, 2007, pp. 11, Number Display (retrieved on Jul. 25, 2008), Internet <URL:http://www.ntt-west.co.jp/flets/hikaridenwa_office/download/hikari_office3.0.pdf>.

[NPL 2] NIPPON TELEGRAM AND TELEPHONE WEST CORPORATION, "Specific Number Notification Service", (retrieved on Jul. 25, 2008), Internet <URL:http://www.ntt-west.co.jp/flets/hikaridenwa_office/service/bangoutuuchi/index.html>.

[NPL 3] TANIGUCHI Noboru, CHIDA Koji, SHIONOIRI Osamu, and KANAI Atsushi "A Note on Anonymity/Pseudonymity/Identity Management of Decentralized Identity Escrow," IEICE Technical Report SITE2005-53, the Institute of Electronics, Information and Communication Engineers

[NPL 4] Andreas Pfitzmann and Marit Hansen "Anonymity, Unlinkability, Undetectability, Unobservability, Pseudonymity, and Identity Management—A Consolidated Proposal for Terminology (retrieved on Jul. 25, 2008), Internet <URL:http://dud.inf.tu-dresden.de/literatur/Anon_Terminology_v0.31.pdf>.

[NPL 5] The Free Encyclopedia 『 Wikipedia 』, "Anonymity", (retrieved Jul. 25, 2008), Internet <URL:http://ja.wikipedia.org/wiki/%E5%8C%BF%E5%90%8D#.E9.96.A2.E9.80.A3.E9.A0.85.E7.9B.AE>

SUMMARY OF INVENTION

Technical Problem

In the foregoing anonymous communication systems, a callee can confirm the anonymity of a caller at the time of establishing the communication session. That is, the callee, being one party of the communication parties, can confirm the anonymity of the caller, being the other party of the communication parties. However, a third party other than the communication partners cannot confirm the anonymities of the communication parties. For this, for example, when a child is making a communication with someone, it is difficult for a parent thereof to confirm the anonymity of its child.

An object of the present invention is to provide an anonymous communication system that enables the third party other than the communication parties to confirm the anonymities of the communication parties.

Solution to Problem

The anonymous communication system of the present invention, which is an anonymous communication system enabling the communication by anonymity, is characterized in detecting the anonymities of the communication parties, and notifying them to a third party device other than the communication devices of the communication parties.

The anonymous communication method of the present invention, which is an anonymous communication method enabling the communication by anonymity, is characterized in detecting the anonymities of the communication parties, and notifying them to a third party device other than the communication devices of the communication parties.

The anonymity notifying apparatus of the present invention, which is an anonymity notifying apparatus to be installed in an anonymous communication system enabling the communication by anonymity, is characterized in detecting the anonymities of the communication parties, and notifying them to a third party device other than the communication devices of the communication parties.

The communication device of the present invention, which constitutes, in an anonymous communication system for including: an anonymity managing means for retaining anonymity management information including a real address, an anonymous address and an anonymity of a communication device; an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information; and an anonymity notifying apparatus for acquiring the anonymity of at least one of the communication parties of the caller device and the callee device that perform the communication through the communication session to be established by the above anonymous communication establishing means from the foregoing anonymity management information, and notifying it to a third party device other than the caller device and the callee device, the foregoing third party device, is characterized in including a means for receiving the foregoing notification information to be notified from the foregoing anonymity notifying apparatus, and outputting the anonymity to be shown by the foregoing notification information in one of a character output form, a voice output form, and a vibration output form, or a plurality of output forms.

The program of the present invention causes a computer constituting an anonymity notifying apparatus to be installed in an anonymous communication system for including: an anonymity managing means for retaining anonymity management information including a real address, an anonymous address and an anonymity of a communication device; and an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information to function as a notifying means for acquiring the anonymity of at least one of the communication parties of the caller device and the callee device that perform the communication through the communication session to be established by the foregoing anonymous communication establishing means from the foregoing anonymity management information, and notifying it to a third party device other than the caller device and the callee device.

The program of the present invention causes a computer constituting a communication device in a anonymous communication system for including: an anonymity managing means for retaining anonymity management information including a real address, an anonymous address and an anonymity of a communication device; an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information; and an anonymity notifying apparatus for acquiring the anonymity of at least one of the communication parties of the caller device and the callee device performing the communication through the communication session to be established by the above anonymous communication establishing means from the foregoing anonymity management information, and notifying it to a third party device other than the caller device and the callee device, the foregoing device being the foregoing third party device, to function as a means for receiving the foregoing notification information to be notified from the foregoing anonymity notifying apparatus, and outputting the anonymity to be shown by the foregoing notification information in one of a character output form, a voice output form, and a vibration output form, or a plurality of output forms.

Advantageous Effect of Invention

The present invention enables the third party other than the communication parties to confirm the anonymities of the communication parties.

BRIEF DESCRIPTION OF DRAWINGS

FIG. 1 is a block diagram of the anonymous communication system related to a first exemplary embodiment of the present invention.

FIG. 2 is a view illustrating an example of data stored in an anonymity management information storing unit in the first exemplary embodiment of the present invention.

FIG. 3 is a view illustrating one example of data stored in a caller/callee anonymity management information temporally-storing unit in the first exemplary embodiment of the present invention.

FIG. 4 is a view illustrating an example of data stored in a communication control information storing unit in the first exemplary embodiment of the present invention.

FIG. 5 is an explanatory view of an operation of the anonymous communication system related to the first exemplary embodiment of the present invention.

FIG. 6 is a block diagram of main parts of the third party device in the first exemplary embodiment of the present invention.

FIG. 7 is a block diagram of the anonymous communication system related to a second exemplary embodiment of the present invention.

FIG. 8 is a view illustrating an example of formats for an anonymity notification request to be used in the second exemplary embodiment of the present invention.

FIG. 15 is a view illustrating an example of data stored in a user attribute storing unit in the fourth exemplary embodiment of the present invention.

FIG. 16 is a view illustrating an example of data stored in an inquiry condition storing unit in the fourth exemplary embodiment of the present invention.

DESCRIPTION OF EMBODIMENT

First Exemplary Embodiment

Figure 9:
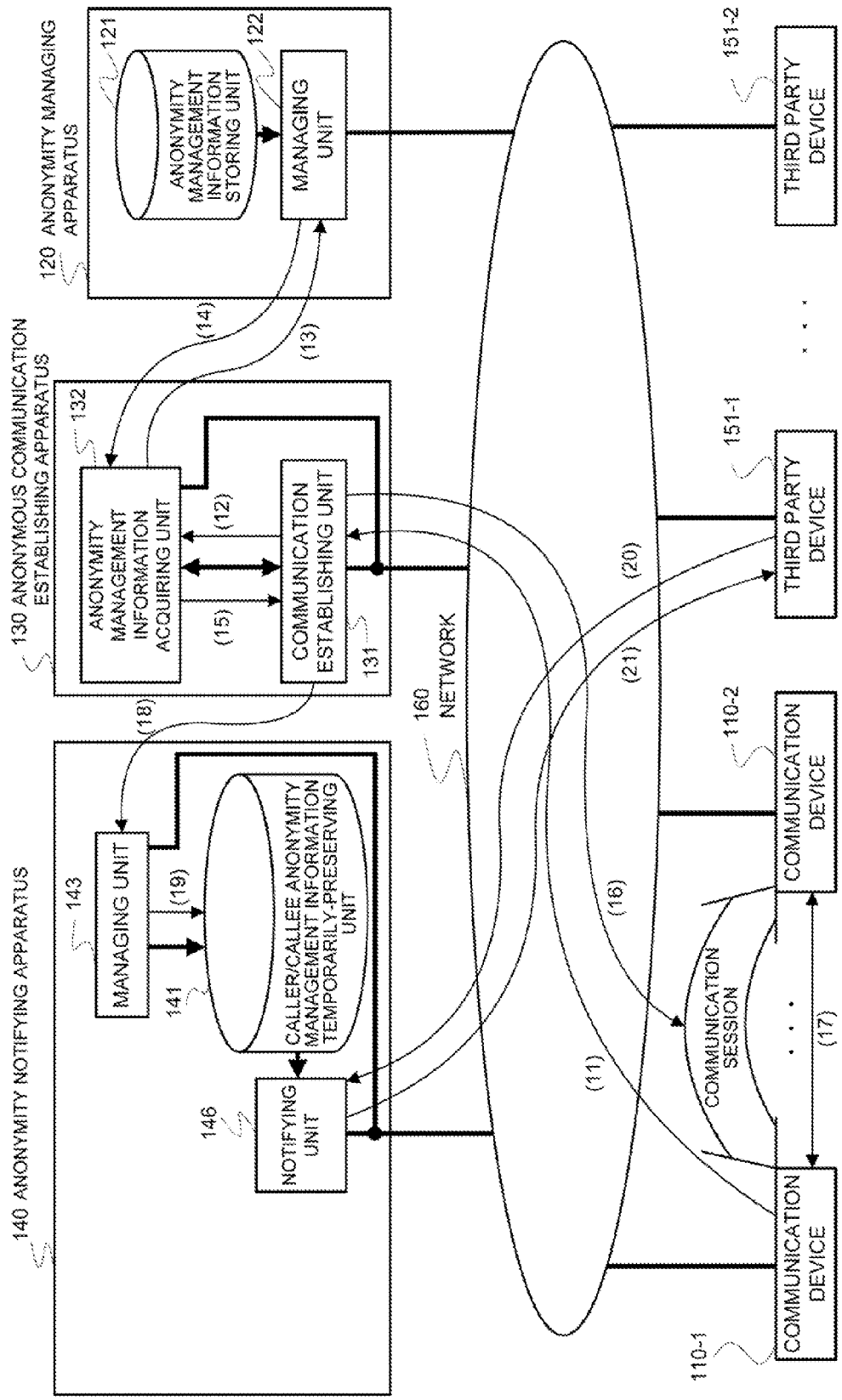
FIG. 9 is an explanatory view of an operation of the anonymous communication system related to the second exemplary embodiment of the present invention.

Upon making a reference to FIG. 1, in an anonymous communication system 100 related to the first exemplary embodiment of the present invention, a plurality of communication devices 110, an anonymity managing apparatus 120, anonymous communication establishing apparatus 130, an anonymity notifying apparatus 140, and a plurality of third party devices 150 are communicatably connected via a network 160.

The communication device 110 is a device in use for the anonymous communication, and specifically, an appliance having communication functions such as a mobile telephone machine and a personal computer. Two kinds of communication addresses of the real address and the anonymous address are assigned to each communication device 110.

The real address is an identifier for uniquely identifying the communication device 110, and specifically a separate telephone number, SIP-URI, or the like. A safety of the user might be jeopardized, for example, the user might receive unnecessary communications when the real address becomes known to a malicious third party because the real address is an identifier that the user cannot change easily.

The anonymous address is an identifier that is issued correspondingly to the real address. A correspondence relation between the real address and the anonymous address is managed in the anonymous communication system, and is not opened to the outside including the communication partner at the moment of the anonymous communication. For this, the real address of the user is not revealed from the anonymous address, and the anonymous communication in which a safety of the user is secured is enabled. Further, when the anonymous address becomes known to a malicious third party, annulling or changing the anonymous address makes it possible to secure a safety of the user without changing the real address.

The third party device 150 is a communication appliance that the third party other than the parties that are making the anonymous communication using the communication device 110 uses in order to confirm the anonymities of the communication parties, and specifically, is an appliance having communication functions such as a mobile telephone machine and a personal computer. To each third party device 150 is assigned a communication address for uniquely identifying the above device.

The anonymity managing apparatus 120, which is an apparatus for retaining/managing anonymity management information of the communication device 110, includes an anonymity management information storing unit 121 and a managing unit 122.

The anonymity management information storing unit 121 is a database for storing the anonymity management information for each communication device 110. The anonymity management information of each communication device 110 is configured of the real address assigned to the above communication device 110, the anonymous address issued correspondingly to this real address, and the anonymity. One example of the anonymity management information stored in the anonymity management information storing unit 121 is shown in FIG. 2.

The anonymity is information indicating at least whether the anonymous address is valid or invalid, and in addition, when the anonymous address is valid, one attribute or more characterizing the anonymity of the anonymous address may be described. As an example of the attribute characterizing the anonymity of the anonymous address, three concepts of identity, pseudonymity, and anonymity are defined in the Non-Patent literature 3. Further, six concepts of anonymity, unlinkability, undetectability, unobservability, pseudonymity, and identity are defined in the Non-Patent literature 4. In addition, two concepts of unlinkability and undeniability are defined in the Non-Patent literature 5. By the way, unlinkability refers to the property that who is an actor cannot be determined and besides, whether the actors having done certain two actions are an identical actor cannot be also determined, and undeniability refers to the property that a person cannot show a third party that the actor having done the above action is not me.

The managing section 122 of the anonymity managing apparatus 120 is a means for retrieving the corresponding anonymity management information from the anonymity management information storing unit 121 responding to a request for acquiring the anonymity management information by the anonymous communication establishing apparatus 130, and giving a response to the anonymous communication establishing apparatus 130.

The anonymous communication establishing apparatus 130, which is an apparatus for establishing the communication session between the communication devices 110, includes a communication establishing unit 131 and an anonymity management information acquiring unit 132.

The communication establishing unit 131 is a means for establishing the communication session between the caller device and the callee device when a communication connection request designating the callee device is transmitted from the communication device 110 via the network 160, and further cancelling the established communication session at the time of finishing the communication. The communication establishing unit 131 acquires the anonymity management information of the caller device and the anonymity management information of the callee device from the anonymity managing apparatus 120 through the anonymity management information acquiring unit 132 when establishing the communication session. Further, the communication establishing unit 131 decides which address, out of the real address and the anonymous address, should be used as an address of the caller device to be notified to the callee device responding to the anonymity of the caller device to be included in the acquired anonymity management information. Additionally, in a case where the anonymous addresses are present in a plural number, the communication establishing unit 131 further decides which anonymous address should be notified when having decided to notify the anonymous address.

Further, the communication establishing unit 131, when establishing the communication session, generates caller/callee anonymity management information including the anonymity management information of the caller device as the caller anonymity management information and the anonymity management information of the callee device as the callee anonymity management information each received from the anonymity management information acquiring unit 132, adds a unique identifier to this caller/callee anonymity management information, and transmits it to the anonymity notifying apparatus 140 via the network 160. In addition, the communication establishing unit 131, when cancelling the communication session, transmits an instruction for designating the identifier added to the caller/callee anonymity management information transmitted at the time of establishing the communication session, and cancelling the caller/callee anonymity management information to the anonymity notifying apparatus 140.

The anonymity management information acquiring unit 132 is a means for transmitting a request for acquiring the anonymity management information of the caller device and the anonymity management information of the callee device to the anonymity managing apparatus 120 via the network 160 according to an instruction by the communication establishing unit 131, receiving the anonymity management information to be sent as a response hereto from the anonymity managing apparatus 120, and conveying it to the communication establishing unit 131.

The anonymity notifying apparatus 140, which is an apparatus for notifying the anonymities of the communication parties that make the communication with each other through the communication session established by the anonymous communication establishing apparatus 130 to the third party device 150, includes a caller/callee anonymity management information temporarily-preserving unit 141, a notification control information storing unit 142, a managing unit 143, a registering unit 144, and a notifying unit 145.

The caller/callee anonymity management information temporarily-preserving unit 141 is a storing means for temporarily preserving the caller/callee anonymity management information. One example of the caller/callee anonymity management information stored in the caller/callee anonymity management information temporarily-preserving unit 141 is shown in FIG. 3.

The managing unit 143 is a means for performing a process of preserving the caller/callee anonymity management information transmitted from the anonymous communication establishing apparatus 130 in the caller/callee anonymity management information temporarily-preserving unit 141. Further, the managing unit 143 performs a process of erasing from the caller/callee anonymity management information temporarily-preserving unit 141 the caller/callee anonymity management information to which an instruction for the erasing has been given by the anonymous communication establishing apparatus 130.

The notification control information storing unit 142 is a storing means for storing notification control information for deciding which communication device 110's anonymity is notified to which third party device 150 and the like. Specifically, the notification control information is composed of the designation information (for example, the real address) of the communication device 110, being a monitoring target, the designation information (for example, the real address) of the third party device 150 to which the anonymity is notified, the designation information of the communication party, being a notification target of the anonymity, and the notification conditions.

For example, when the parent desires to monitor the anonymity of the anonymous communication that is made in the mobile telephone machine of its child, the real address of the mobile telephone machine of its child, for example, is set to the designation information of the communication device 110, being a monitoring target.

For example, in the foregoing example, when a parent desires that the anonymity of the anonymous communication that is made in a mobile telephone machine of its child is notified to its own mobile telephone machine, the real address of the mobile telephone machine of the parent itself, for example, is set to the designation information of the third party device 150 to which the anonymity is notified.

A classification as to the anonymity of the caller device should be notified, the anonymity of the callee device should be notified, and the anonymities of both should be notified is set to the designation information of the communication party, being a notification target of the anonymity.

For example, "a condition that the anonymity is notified at the time of establishing the communication session", "a condition that the anonymity is notified after t seconds elapse since a start of the communication", "a condition that only the pre-set anonymity is notified", "a condition that the anonymity is notified only when the communication is made within a pre-set time zone", "a condition that the anonymity is notified only when the communication device, being a monitoring target, is the caller device", "a condition that the anonymity is notified only when the communication device, being a monitoring target, is the callee device" and the like are set to the notification condition. One example of the notification control information stored in the notification control information storing unit 142 is shown in FIG. 4.

Additionally, the notification target of the anonymity and the notification condition within the notification control information are not essential, and can be omitted. When they have been omitted, how the anonymity that should be notified, and the notification condition are set is left to the system setting. How the system is set is arbitrary, and the system settings exemplified below, for example, is thinkable.

(1) The anonymity of the caller device is notified.
(2) The anonymity of the caller device and the anonymous address thereof are notified.
(3) The anonymity of the callee device is notified.
(4) The anonymity of the callee device and the anonymous address thereof are notified.
(5) The anonymities of the caller device and the callee device are notified.
(6) The anonymities of the caller device and the callee device, and the anonymous addresses thereof are notified.
(7) The timing is set in such a manner that whether or not to make the above-mentioned notifications (1) to (6) is determined after a lapse of t seconds since a start of the communication.

The registering unit 144 is a means for registering the notification control information into the notification control information storing unit 142. The registering unit 144 receives a registration request via the network 160 from the communication device 110 and the third party device 150, affixes a registration number to the notification control information attached to the above registration request, and registers it into the notification control information storing unit 142. Further, when the registering unit 144 receives a deletion request via the network 160 from the communication device 110 and the third party device 150, it performs a process of deleting the notification control information designated by the deletion request from the notification control information storing unit 142.

The notifying unit 145 is a means for determining a necessity for notifying the anonymities of the communication parties during a time ranging from the registration of the new caller/callee anonymity management information related to the communication between the communication devices 110 into the caller/callee anonymity management information temporarily-preserving unit 141 up to the deletion thereof, namely, during a period that the established communication session is active, and notifying them to the corresponding communication third party device 150, if necessary.

Specifically, the notifying unit 145 pays attention to the caller anonymity management information to be included in the caller/callee anonymity management information, and performs the following process. At first, the notifying unit 145 retrieves the notification control information within the caller anonymity management information, which defines the communication device to be specified by the real address as a monitoring target, from the notification control information storing unit 142. When the notifying unit 145 fails in the retrieval, it finishes the process as to the caller anonymity management information. When the notifying unit 145 succeeds in the retrieval, it evaluates the notification condition to be included in the retrieved notification control information, and determines whether or not the notification is enabled. When the notifying unit 145 has determined that there is no necessity for the notification, it finishes the process as to the caller anonymity management information. When the notifying unit 145 has determined that the notification is enabled, it notifies the anonymity of the communication party designated by the designation information of the communication party, being a notification target of the anonymity, which is included in the retrieved notification control information, out of the anonymities within the caller anonymity management information and the callee anonymity management information, to the third party device 150 that is designated by the retrieved notification control information. With this, the notifying unit 145 finishes the process paying attention to the caller anonymity management information, next pays attention to the callee anonymity management information, and repeats a process similar to the process paying attention to the caller anonymity management information. Additionally, at the moment of notifying the anonymity, the anonymous address having the above anonymity may be notified together therewith.

Next, an exemplary operation of the anonymous communication system 100 related to this exemplary embodiment will be explained. A scheme of notifying the anonymities of the communication parties to the third party device 150-1 when the communication is made in the communication device 110-1 is listed as an example. Herein, it is assumed that the user of the communication device 110-1 is A, the real address is sip:101@example.com, the anonymous address is sip:anonym-1-1@example.com, and the anonymity is unlinkability & undeniability, and that the user of the third party device 150-1 is X, and the real address is sip:301@example.com.

The user X registers the notification control information into the anonymity notifying apparatus 140 so that when the anonymous communication is made in the communication device 110-1, the anonymities of the communication parties are notified to the third party device 150-1. This registration is enabled, for example, by making access to the registering unit 144 of the anonymity notifying apparatus 140 from the third party device 150-1, and inputting necessary information. While the registering manipulation was performed from the third party device 150-1 herein, the registering manipulation can be also performed from the communication device 110-1. With this registering manipulation, it is assumed that the notification control information of a registration number X001 of FIG. 4 has been registered into the notification control information storing unit 142 of the anonymity notifying apparatus 140. Additionally, the registering unit 144 may authenticate registers to exclude the registration by unjustified registers at the moment of registering the notification control information.

Continuously, an operation at the moment that the user A makes the anonymous communication with the communication device 110-2 of the user B from the communication device 110-1 will be explained by making reference to FIG. 5. Herein, it is assumed that the real address of the communication device 110-2 of the user B is sip:201@example.com, the anonymous address is sip:anonym-2-1@example.com, and the anonymity is unlinkability & undeniability.

When the user A performs a call manipulation to the user B over the communication device 110-1, a communication connection request is transmitted to the communication establishing unit 131 of the anonymous communication establishing apparatus 130 via the network 160 from the communication device 110-1 ((1) of FIG. 5). In this communication connection request, for example, the real address of the communication device 110-1 is included as information for specifying the communication device 110-1, being a caller device, and for example, the anonymous address of the communication device 110-2 is included as information for specifying the callee device.

The communication establishing unit 131 delivers the real address of the caller device to be included in the communication connection request, and the anonymous address of the callee device to the anonymity management information acquiring unit 132, and makes a request for acquiring the caller anonymity management information and the callee anonymity management information ((2) of FIG. 5).

The anonymity management information acquiring unit 132 transmits a request for acquiring the anonymity management information including the real address of the caller device and a request for acquiring the anonymity management information including the anonymous address of the callee device to the managing unit 122 of the anonymity managing apparatus 120 via the network 160 ((3) of FIG. 5).

The managing unit 122 retrieves the anonymity management information including a real address identical to that of the caller device, and the anonymity management information including an anonymous address identical to that of the callee device from the anonymity management information storing unit 121, and transmits the discovered anonymity management information to the anonymity management information acquiring unit 132 via the network 160 ((4) of FIG. 5). The anonymity management information acquiring unit 132 conveys the received anonymity management information to the communication establishing unit 131 ((5) of FIG. 5). As a result, it follows that the anonymity management information of the first line shown in FIG. 2, and the anonymity management information of the second line shown in FIG. 2 are delivered as the caller anonymity management information and the callee anonymity management information, respectively, to the communication establishing unit 131.

The communication establishing unit 131 confirms that the anonymity within the caller anonymity management information is unlinkability & undeniability, and decides to use the anonymous address as an address of the caller device that is notified to the callee device. And, the communication establishing unit 131 reads out the real address of the communication device 110-2, being a callee device, from the callee anonymity management information, conceals the real address of the communication device 110-1, being a caller device, from the communication device 110-2, being a callee device, notifies the anonymous address within the caller anonymity management information instead thereof, and establishes the communication session between the communication device 110-1 and the communication device 110-2 ((6) of FIG. 5). This allows the communication device 110-1 and the communication device 110-2 to start the communication through the above communication session ((7) of FIG. 5).

Simultaneously therewith, the communication establishing unit 131 transmits the caller/callee anonymity management information including the caller anonymity management information and the callee anonymity management information to the managing unit 143 of the anonymity notifying apparatus 140 via the network 160 ((8) of FIG. 5). The managing unit 143 registers the received caller/callee anonymity management information into the caller/callee anonymity management information temporarily-preserving unit 141 ((9) of FIG. 5). This allows the caller/callee anonymity management information shown in the first line of FIG. 3 to be registered into the caller/callee anonymity management information temporarily-preserving unit 141.

The notifying unit 145 of the anonymity notifying apparatus 140 firstly pays attention to the caller anonymity management information, out of the caller/callee anonymity management information newly registered into the caller/callee anonymity management information temporarily-preserving unit 141. When the notifying unit 145 retrieves the notification control information that includes the real address within this caller anonymity management information as the real address of the communication device, being a monitoring target, from the notification control information storing unit 142, it obtains the notification control information of the first line of FIG. 4, whereby it evaluates the notification condition to be included in the above notification control information, and determines whether or not the notification is enabled. The notification condition of the notification control information described in the first line of FIG. 4, which is "the case of the caller", meets this-time condition that the communication device 110-1 is the caller device, whereby the notifying unit 145 determines that the notification is enabled. And, the notifying unit 145 transmits the notification information including the anonymity of the communication party, being a notification target of the anonymity, to be included in the retrieved notification control information to the third party device 150-1 to be specified by a communication address to be included in the notification control information ((10) of FIG. 5). In this case, the notification information having the anonymity within the caller anonymity management information taken as the anonymity of the caller device, and the anonymity within the callee anonymity management information taken as the anonymity of the callee device is transmitted because the notification target of the anonymity is the caller device and the callee device. At this time, the anonymous address of the caller device and the anonymous address of the callee device may be incorporated into the notification information for transmission.

The third party device 150-1, upon receipt of the notification information, presents the notification information to the user X. As a method of presenting the notification information, one of the method of displaying on the display screen, the method of outputting in a voice or sound form, and the method of outputting in a vibration form may be used, and a combination thereof may be used. One example of a configuration of presenting the notification information is shown in FIG. 6. In this example, a notification information receiving unit 161 receives the notification information from the notifying unit 145, and conveys it to a displaying unit 162, a voice generating unit 163 and a vibration generating unit 164. Upon top of displaying <A san is making the anonymous communication> saying the effect that A, being a monitoring target, is making the anonymous communication on the displaying screen such as a liquid crystal display, the displaying unit 162 displays the anonymities of the caller device and the callee device notified by the notification information. Further, the voice generating unit 163 outputs the similar content in a voice form from the voice output element such as a loudspeaker. In addition, the vibration generating unit 164 notifies the anonymity to the user X, for example, by vibrating a vibrator with a vibration pattern caused to correspond to each anonymity on a one-to-one basis.

Thereafter, after the communication between the communication device 110-1 and the communication device 110-2 is finished, the communication establishing unit 131 of the anonymous communication establishing apparatus 130 releases the communication session established between the communication device 110-1 and the communication device 110-2. Further, the communication establishing unit 131 designates the identifier of the caller/callee anonymity management information transmitted to the anonymity notifying apparatus 140 at the time of establishing this communication session, and requests the managing unit 143 of the anonymity notifying apparatus 140 via the network 160 to delete the caller/callee anonymity management information. The managing unit 143, in response to this request, deletes the corresponding caller/callee anonymity management information from the caller/callee anonymity management information temporarily-preserving unit 141.

Next, an effect of this exemplary embodiment will be explained.

This exemplary embodiment enables the third party other than the communication parties to confirm the anonymities the communication parties.

Further, in accordance with this exemplary embodiment, once the third party registers the notification control information into the anonymity notifying apparatus 140, it automatically can receive a notification of the anonymities whenever the anonymous communication using the communication device defined as a monitoring target is made.

Further, this exemplary embodiment makes it possible to freely select the reception of a notification of only the anonymity of the caller device, the reception of a notification of only the anonymity of the callee device, and the reception of a notification of the anonymities of both when the anonymous communication is started with a certain communication device as a caller device and another communication device as a callee device because the communication party, being a notification target of the anonymity, can be designated by the notification control information.

Further, according to this exemplary embodiment, previously setting arbitrary notification conditions such as "a condition that only the previously-set anonymity is notified", "a condition that the anonymity is notified only when the communication is made within a pre-set time zone", "a condition that the anonymity is notified when the communication device, being a monitoring target, is the caller device", and "a condition that the anonymity is notified when the communication device, being a monitoring target, is the callee device" makes it possible to receive only a desired notification because the notification condition can be designated by the notification control information.

Second Exemplary Embodiment

Upon making a reference to FIG. 7, an anonymous communication system 200 related to the second exemplary embodiment of the present invention, as compared with the anonymous communication system 100 related to the first exemplary embodiment shown in FIG. 1, differs in a point of not including units equivalent to the notification control information storing unit 142 and the registering unit 144 within the anonymity notifying apparatus 140, in a point of including a notifying unit 146 instead of the notifying unit 145, and in a point of including a third party device 151 instead of the third party device 150, and is identical in other points to the anonymous communication system 100 related to the first exemplary embodiment.

The third party device 151 has a function of transmitting the anonymity notification request to the notifying unit 146 of the anonymity notifying apparatus 140 via the network 160 in addition to a function of receiving the notification information of the anonymities. The anonymity notification request is composed of the designation information (for example, the real address) of the communication device 110, being a monitoring target, the designation information (for example, the real address) of the third party device 151 to which the anonymity is notified, the designation information of the communication party, being a notification target of the anonymity, and the notification conditions, as shown in FIG. 8(a). FIG. 8(b) shows a specific example of the anonymity notification request.

For example, when the parent desires to monitor the anonymity of the anonymous communication that is made in the mobile telephone machine of its child, the real address of the mobile telephone machine of its child, for example, is set to the designation information of the communication device 110, being a monitoring target.

For example, in the foregoing example, when a parent desires that the anonymity of the anonymous communication that is made in a mobile telephone machine of its child is notified to its own mobile telephone machine, the real address of the mobile telephone machine of the parent itself, for example, is set to the designation information of the third party device 151 to which the anonymity is notified. Herein, the third party device 151 for transmitting the anonymity notification request and the third party device 151 to which the anonymity is notified could not always be an identical device.

A classification as to the anonymity of the caller device should be notified, the anonymity of the callee device should be notified, and the anonymities of both should be notified is set to the notification target of the anonymity.

For example, "a condition that the anonymity is notified at the time of establishing the communication session", "a condition that the anonymity is notified after t seconds elapse since a start of the communication", "the anonymity is notified only in a case of the anonymous communication that is made in a manner the anonymity of the caller device is such and such", "the anonymity is notified only in a case of the anonymous communication that is made in a manner the anonymity of the callee device is such and such", "a condition that the anonymity is notified only when the communication device, being a monitoring target, is the caller device", "a condition that the anonymity is notified only when the communication device, being a monitoring target, is the callee device" and the like are set to the notification condition.

Additionally, the notification target of the anonymity and the notification condition within the anonymity notification request are not essential, and can be omitted. When they have been omitted, how the anonymity that should be notified and the notification condition are set is left to the system setting. How the system is set is arbitrary, and the system settings exemplified below, for example, is thinkable.

(1) The anonymity of the caller device is notified.
(2) The anonymity of the caller device and the anonymous address thereof are notified.
(3) The anonymity of the callee device is notified.
(4) The anonymity of the callee device and the anonymous address thereof are notified.
(5) The anonymities of the caller device and the callee device are notified.
(6) The anonymities of the caller device and the callee device, and the anonymous addresses thereof are notified.
(7) The timing is set in such a manner that whether or not to make the above-mentioned notifications (1) to (6) is determined after a lapse of t seconds since a start of the communication.

The notifying unit 146 of the anonymity notifying apparatus 140 is a means for receiving the anonymity notification request from the third party device 151 via the network 160, generating a response to this anonymity notification request, and transmitting it to the designated third party device 151. Specifically, the notifying unit 146 performs the following process. At first, the notifying unit 146 retrieves the caller anonymity management information including the real address of the communication device designated as a monitoring target by the anonymity notification request, and the callee anonymity management information from the caller/callee anonymity management information temporarily-preserving unit 141. When the notifying unit 146 fails in the retrieval, it transmits, for example, a response saying the effect that the communication device, being a monitoring target, is not making the communication to the third party device 151. When the notifying unit 146 succeeds in the retrieval, it evaluates the notification condition within the anonymity notification request, and determines whether or not the notification is enabled. When the notifying unit 146 has determined that there is no necessity for the notification, it transmits, for example, a response saying the effect that even though the communication device, being a monitoring target, is making the communication, the communication condition has not held to the third party device 151. When the notifying unit 146 has determined that the notification is enabled, it notifies the anonymity of the communication party that is designated by the designation information of the communication party, being a notification target of the anonymity, within the anonymity notification request, out of the anonymities to be included in the retrieved caller or callee anonymity management information, to the third party device 151 designated by the anonymity notification request. Additionally, at the moment of notifying the anonymity, the anonymous address having the above anonymity may be notified together therewith.

Next, an exemplary operation of the anonymous communication system 200 related to this exemplary embodiment will be explained. A scheme in which the anonymity notification request designating the communication device 110-1 as a monitoring target is transmitted from the third party device 151-1 to the anonymity notifying apparatus 140 while the anonymous communication is made in the communication device 110-1 is listed as an example. Herein, it is assumed that the user of the communication device 110-1 is A, the real address is sip: 101@example.com, the anonymous address is sip:anonym-1-1@example.com, and the anonymity is unlinkability & undeniability, and that the user of the third party device 151-1 is X, and the real address is sip:301@example.com.

At first, an operation at the moment that the anonymous communication is made in the communication device 110-1 of the user A will be explained by making reference to FIG. 9 with the case that the communication partner is, for example, the communication device 110-2 of the user B taken as an example. Herein, it is assumed that the real address of the communication device 110-2 of the user B is sip:201@example.com, the anonymous address is sip:anonym-2-1@example.com, and the anonymity is unlinkability & undeniability.

When the user A performs a call manipulation to the user B over the communication device 110-1, a communication connection request is transmitted to the communication establishing unit 131 of the anonymous communication establishing apparatus 130 via the network 160 from the communication device 110-1 ((11) of FIG. 9). In this communication connection request, for example, the real address of the communication device 110-1 is included as information for specifying the communication device 110-1, being a caller device, and for example, the anonymous address of the communication device 110-2 is included as information for specifying the communication device 110-2, being a callee device.

The communication establishing unit 131 delivers the real address of the caller device and the anonymous address of the callee device that are included in the communication connection request to the anonymity management information acquiring unit 132, and makes a request for acquiring the caller anonymity management information and the callee anonymity management information ((12) of FIG. 9).

The anonymity management information acquiring unit 132 transmits a request for acquiring the anonymity management information including the real address of the caller device and a request for acquiring the anonymity management information including the anonymous address of the callee device to the managing unit 122 of the anonymity managing apparatus 120 via the network 160 ((13) of FIG. 9).

The managing unit 122 retrieves the anonymity management information including a real address identical to that of the caller device, and the anonymity management information including an anonymous address identical to that of the callee device from the anonymity management information storing unit 121, and transmits the discovered anonymity management information to the anonymity management information acquiring unit 132 via the network 160 ((14) of FIG. 9). The anonymity management information acquiring unit 132 conveys the received anonymity management information to the communication establishing unit 131 ((15) of FIG. 9). As a result, it follows that the anonymity management information of the first line shown in FIG. 2, and the anonymity management information of the second line shown in FIG. 2 are delivered as the caller anonymity management information and the callee anonymity management information, respectively, to the communication establishing unit 131.

The communication establishing unit 131 confirms that the anonymity within the caller anonymity management information is unlinkability & undeniability, and decides to use the anonymous address as an address of the caller device that is notified to the callee device. And, the communication establishing unit 131 reads out the real address of the communication device 110-2, being a callee device, from the callee anonymity management information, conceals the real address of the communication device 110-1, being a caller device, from the communication device 110-2, being a callee device, notifies the anonymous address within the caller anonymity management information instead thereof, and establishes the communication session between the communication device 110-1 and the communication device 110-2 ((16) of FIG. 9). This allows the communication device 110-1 and the communication device 110-2 to start the communication through the above communication session ((17) of FIG. 9).

Simultaneously therewith, the communication establishing unit 131 transmits the caller/callee anonymity management information including the caller anonymity management information and the callee anonymity management information to the managing unit 143 of the anonymity notifying apparatus 140 via the network 160 ((18) of FIG. 9). The managing unit 143 registers the received caller/callee anonymity management information into the caller/callee anonymity management information temporarily-preserving unit 141 ((19) of FIG. 9). This allows the caller/callee anonymity management information shown in the first line of FIG. 3 to be registered into the caller/callee anonymity management information temporarily-preserving unit 141.

The operation so far is identical to that of the first embodiment explained by making a reference FIG. 5.

Next, an operation at the moment that the user X transmits the anonymity notification request from the third party device 151-1 while the anonymous communication is made between the communication device 110-1 and the communication device 110-2 will be explained.

Figure 10:
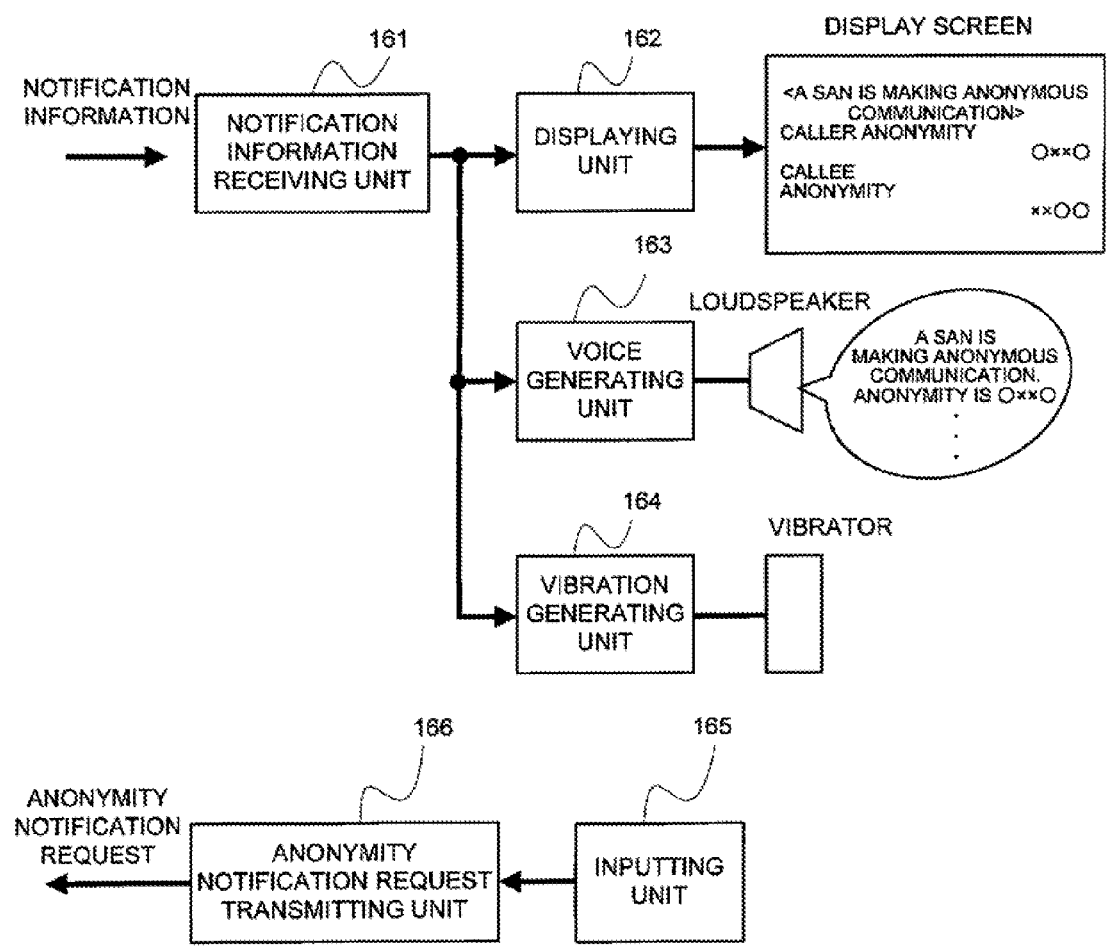
FIG. 10 is a block diagram of main parts of the third party device in the second exemplary embodiment of the present invention.

Upon making reference to FIG. 10, an inputting unit 165 such as a keyboard and an anonymity notification request transmitting unit 166 are installed in the third party device 151-1. When the user X inputs the real address of the communication device, being a monitoring target, the real address of its own device, the notification target of the anonymity and the notification condition from the inputting unit 165 so that the anonymity of the communication party of the anonymous communication that is being made in the communication device 110-1 is notified, the anonymity notification request transmitting unit 166 generates the anonymity notification request as shown in FIG. 8(*b*) from the inputted information, and transmits it to the notifying unit 146 of the anonymity notifying apparatus 140 via the network 160 ((20) of FIG. 9).

The notifying unit 146 of the anonymity notifying apparatus 140, upon receipt of the anonymity notification request via the network 160 from the third party device 151-1, retrieves the caller anonymity management information including a real address identical to that of the communication device, being a monitoring target, within the anonymity notification request, and the callee anonymity management information from the caller/callee anonymity management information temporarily-preserving unit 141. The caller anonymity management information shown in the first line of FIG. 3 is retrieved with the case of the anonymity notification request of FIG. 8(*b*) because the real address of the communication device, being a monitoring target, is sip:101®example.com. Next, the notifying unit 146 evaluates the notification condition within the anonymity notification request, and determines whether or not the notification is enabled. The notifying unit 146 determines that the notification is enabled with the case of the anonymity notification request of FIG. 8(*b*) because the notification condition is "the case of the caller", and this time condition that the communication device 110-1 is the origination side is matched to the above the notification condition. Next, the notifying unit 146 notifies the anonymity of the communication party that is designated by the designation information of the communication party, being a notification target of the anonymity, within the anonymity notification request to the third party device 151-1 that is specified by the communication address within the anonymity notification request ((21) of FIG. 9). In this case, the notification target of the anonymity is the caller device and the callee device, whereby the notification information that the anonymity within the foregoing retrieved caller anonymity management information is defined as the anonymity of the caller device, and the anonymity within the callee anonymity management information corresponding to this caller anonymity management information is defined as the anonymity of the callee device is transmitted. The anonymous address of the caller device and the anonymous address of the callee device at this moment may be incorporated into the notification information for transmission.

The third party device 151-1, upon receipt of the notification information by the notification information receiving unit 161 shown in FIG. 10, presents the notification information to the user X by displaying on the display screen by the displaying unit 162, outputting in a voice form by the voice generating unit 163, and outputting in a vibration form by the vibration generating unit 164.

Thereafter, after the communication between the communication device 110-1 and the communication device 110-2 is finished, the communication establishing unit 131 of the anonymous communication establishing apparatus 130 releases the communication session established between the communication device 110-1 and the communication device 110-2. Further, the communication establishing unit 131 designates the identifier of the caller/callee anonymity management information transmitted to the anonymity notifying apparatus 140 at the time of establishing this communication session, and requests the managing unit 143 of the anonymity notifying apparatus 140 via the network 160 to delete the caller/callee anonymity management information. The managing unit 143, in response to this request, deletes the corresponding caller/callee anonymity management information from the caller/callee anonymity management information temporarily-preserving unit 141. For this, a response saying the effect that the communication device 110-1 and the communication device 110-2 are not making the communication is returned even though the anonymity notification request in which the communication device 110-1 and the communication device 110-2 are defined as a monitoring target, respectively, is issued from the third party device 151-1 to the anonymity notifying apparatus 140 because the corresponding anonymity management information of the caller or the callee is not preserved in the caller/callee anonymity management information temporarily-preserving unit 141.

Next, an effect of this exemplary embodiment will be explained.

This exemplary embodiment enables the third party other than the communication parties to confirm the anonymities of the communication parties.

Further, according to this exemplary embodiment, the third party itself can control the timing in which the notification is received because the anonymity of the communication party is notified to the third party in a form of making a response to the anonymity notification request transmitted by the third party.

Further, this exemplary embodiment makes it possible to notify the anonymities of the communication parties to the third party only provided that the communication device, being a monitoring target, is actually making the anonymous communication, which yields, as an additional effect, an effect of being able to detect whether or not the communication device, being a monitoring target, is actually making the anonymous communication.

Further, this exemplary embodiment makes it possible to freely select the reception of a notification of only the anonymity of the caller device, the reception of a notification of only the anonymity of the callee device, and the reception of a notification the anonymities of both when the anonymous communication is started with a certain communication device as a caller device and another communication device as a callee device because the notification target of the anonymity can be designated by the anonymity notification request.

Further, according to this exemplary embodiment, previously setting arbitrary notification conditions such as "a condition that only the previously-set anonymity is notified", "a condition that the anonymity is notified when the communication device, being a monitoring target, is the caller device" and "a condition that the anonymity is notified when the communication device, being a monitoring target, is the callee device" makes it possible to receive only a desired notification because the notification condition can be designated by the anonymity notification request.

Third Exemplary Embodiment

Figure 11:
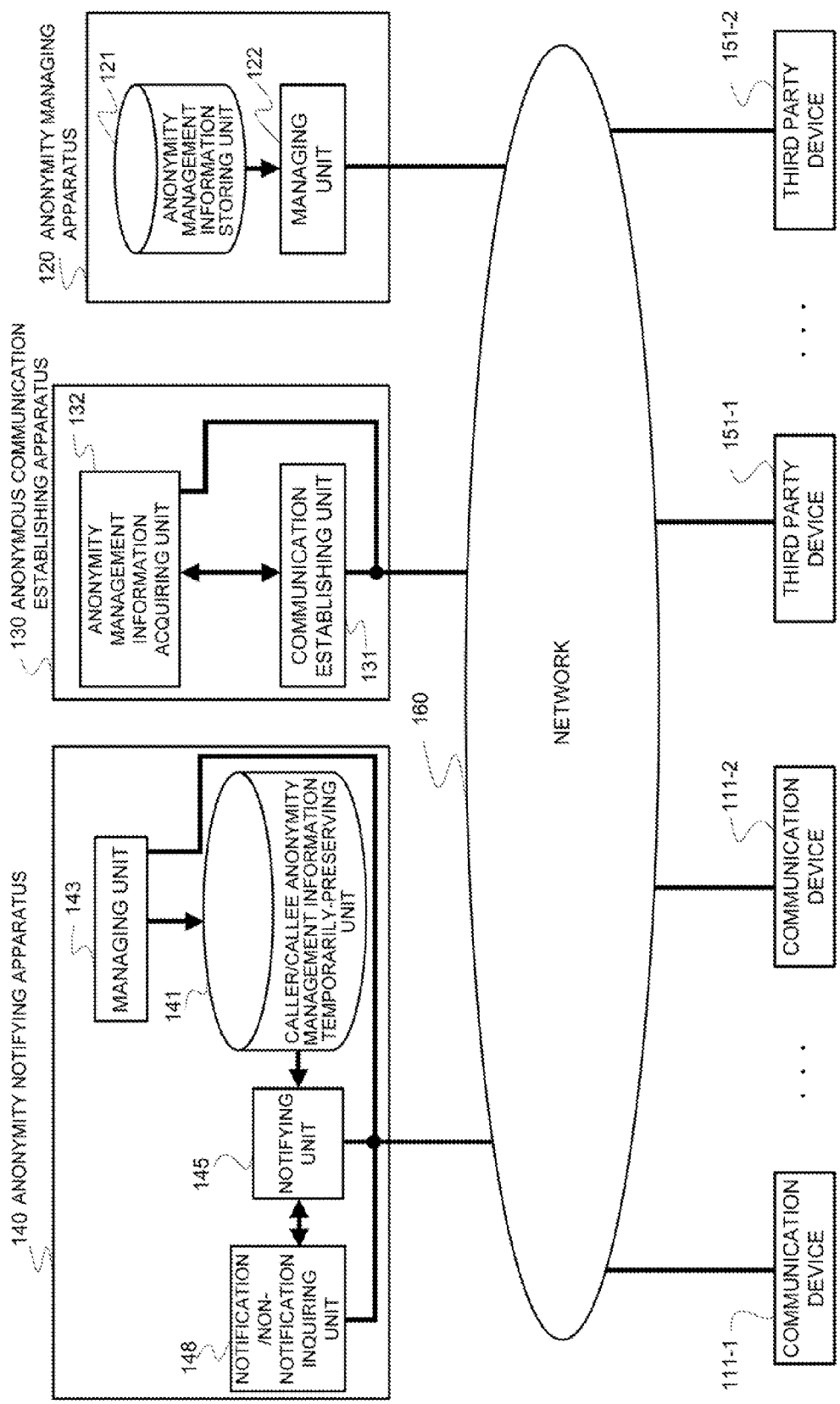
FIG. 11 is a block diagram of the anonymous communication system related to a third exemplary embodiment of the present invention.

Upon making a reference to FIG. 11, an anonymous communication system 300 related to the third exemplary embodiment of the present invention, as compared with the anonymous communication system 200 related to the second exemplary embodiment shown in FIG. 7, differs in a point of newly including a notification/non-notification inquiring unit 148 within the anonymity notifying apparatus 140, in a point of including a notifying unit 147 instead of the notifying unit 146, and in a point of including a communication device 111 instead of the communication device 110, and is identical in other points to the anonymous communication system 200 related to the second exemplary embodiment.

The notification/non-notification inquiring unit 148 is a means for, according to an instruction from the notifying unit 147, inquiring of the communication device 111, which is making the anonymous communication, as to whether or not the anonymity of the anonymous address that is being used in the anonymous communication may be notified to the third party, and returning a response result from the communication device 111 to the notifying unit 147.

The notifying unit 147, as compared with the notifying unit 146 of the second exemplary embodiment, differs in a point that, prior to notifying the anonymity of the communication device 111 to the third party device 151 according to the anonymity notification request received from the third party device 151, inquiring of the communication device 111 through the notification/non-notification inquiring unit 148 as to whether or not the above notification is enabled, and notifies the anonymity only when a response of permission is returned from the communication device 111.

The communication device 111 has a function of receiving the inquiry from the notification/non-notification inquiring unit 148 of the anonymity notifying apparatus 140, and transmitting a response hereto to the notification/non-notification inquiring unit 148 in addition to the function of the communication device 110 of the second exemplary embodiment.

Next, an exemplary operation of the anonymous communication system 300 related to this exemplary embodiment will be explained. A scheme in which the anonymity notification request designating the communication device 111-1 as a monitoring target is transmitted from the third party device 151-1 to the anonymity notifying apparatus 140 while the anonymous communication is made in the communication device 111-1 is listed as an example. Herein, it is assumed that the user of the 111-1 is A, the real address is sip:101@example.com, the anonymous address is sip:anonym-1-1@example.com, and the anonymity is unlinkability & undeniability, and that the callee device for making the anonymous communication in which the communication device 111-1 is the caller device is the communication device 111-2, its user is B, and its real address is sip:201@example.com, its anonymous address is sip:anonym-2-1@example.com, and the anonymity is unlinkability & undeniability. Further, it is assumed that the user of the third party device 151-1 is X, and the real address is sip:301@example.com.

Figure 12:
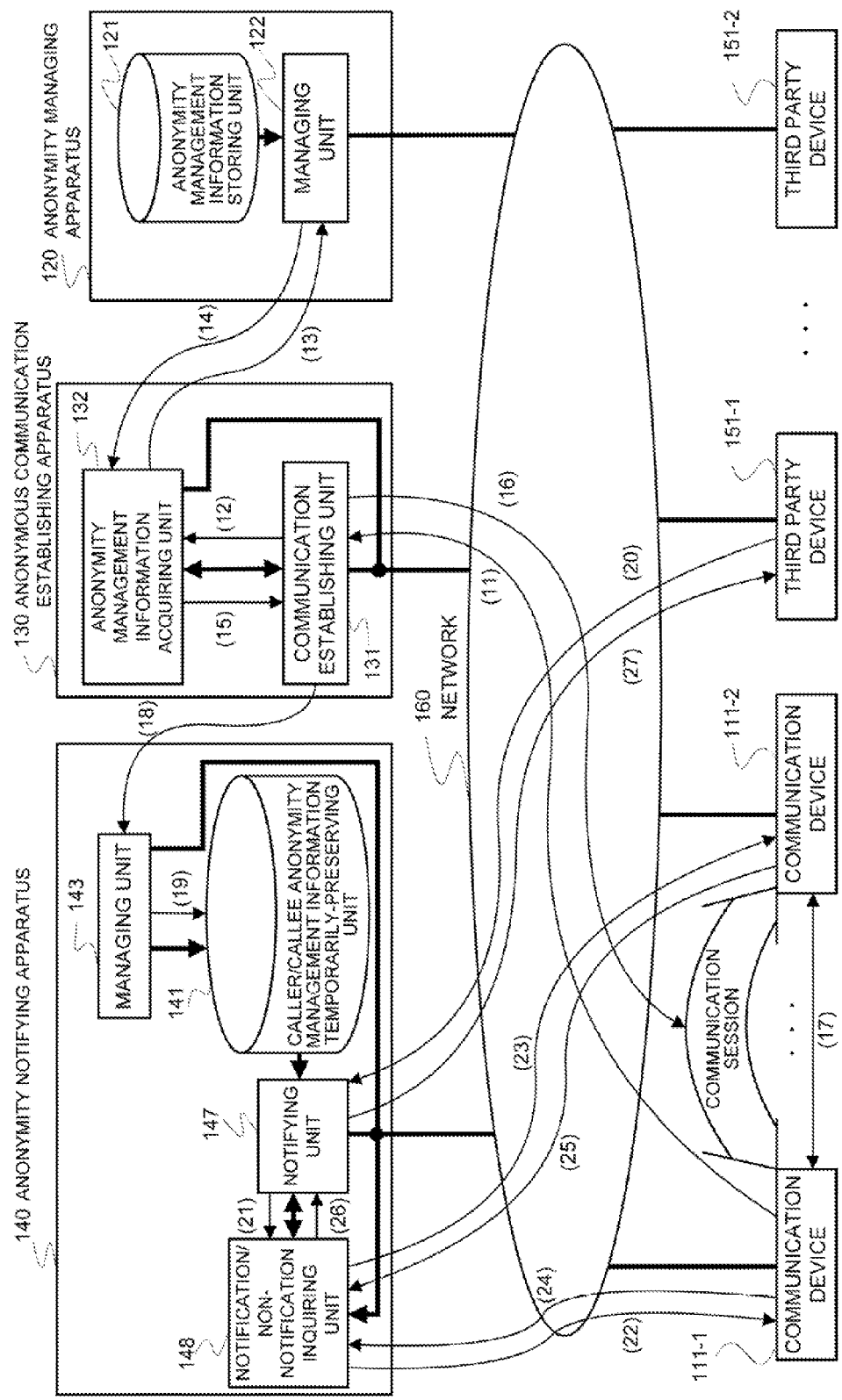
FIG. 12 is an explanatory view of an operation of the anonymous communication system related to the third exemplary embodiment of the present invention.

An operation at the moment that the anonymous communication between the communication device 111-1 of the user A, which is the caller device, and the communication device 111-2 of the user B is made is identical to the operation at the moment that the anonymous communication between the communication device 110-1 of the user A, which is the caller device, and the communication device 110-2 of the user B is made in the second exemplary embodiment, and the operation is performed according the procedure (11) to (19) of FIG. 12. This allows the caller/callee anonymity management information shown in the first line of FIG. 3 to be registered into the caller/callee anonymity management information temporarily-preserving unit 141.

Next, an operation at the moment that the user X transmits the anonymity notification request from the third party device 151-1 while the anonymous communication is made between the communication device 111-1 and the communication device 111-2 will be explained.

The user X transmits, for example, the anonymity request shown in FIG. 8(b) to the notifying unit 147 of the anonymity notifying apparatus 140 from the third party device 151-1 via the network 160 so that the anonymities of the communication parties of the anonymous communication that is being made in the communication device 111-1 are notified ((20) of FIG. 12).

The notifying unit 147 of the anonymity notifying apparatus 140, upon receipt of the anonymity notification request via the network 160 from the third party device 151, retrieves the caller anonymity management information including a real address identical to that of the communication device, being a monitoring target, within the anonymity notification request, and the callee anonymity management information from the caller/callee anonymity management information temporarily-preserving unit 141. The caller anonymity management information shown in the first line of FIG. 3 is retrieved with the case of the anonymity notification request of FIG. 8(b) because the real address of the communication device, being a monitoring target, is sip:101@example.com. Next, the notifying unit 147 evaluates the notification condition within the anonymity notification request, and determines whether or not the notification is enabled. The notifying unit 147 determines that the notification is enabled with the case of the anonymity notification request of FIG. 8(b) because the notification condition is "the case of the caller", and this time condition that the communication device 111-1 is the origination side is matched to the above the notification condition.

Next, the notifying unit 147 makes a reference to the anonymity of the communication device, being a notification target of the anonymity, which is included in the caller anonymity management information, confirms that the notification target of the anonymity is the caller device and the callee device, and decides both of the communication device 111-1, being the caller device, and the communication device 111-2, being the callee device, to be an inquiry destination, respectively. Next, the notifying unit 147 delivers the real address of the third party device 151-1 within the anonymity notification request, and the real addresses of the communication device 111-1 and the communication device 111-2 as anonymity notification destination information and as inquiry destination information, respectively, to the notification/non-notification inquiring unit 148, and gives an instruction for the inquiry ((21) of FIG. 12).

The notification/non-notification inquiring unit 148 inquires of both of the communication device 111-1 and the communication device 111-2 as to whether respective anonymities may be notified to the third party device 151-1 via the network 160 by indicating the designation information (for example, the real address) of the third party device 151-1 ((22) and (23) of FIG. 12). At this time, respective anonymous addresses may be incorporated in the inquiry.

Figure 13:
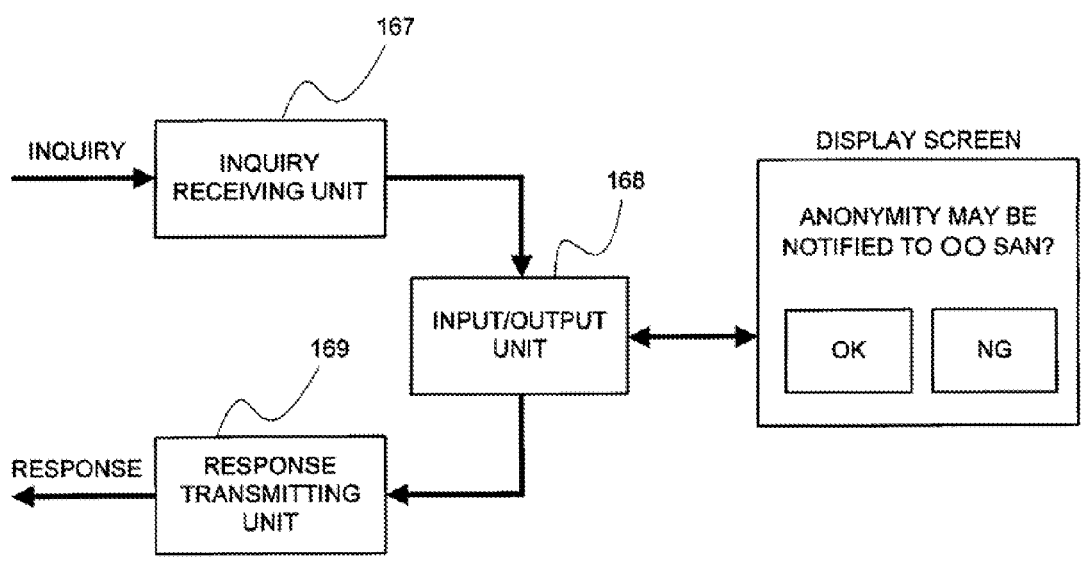
FIG. 13 is a block diagram of main parts of the communication device in the third exemplary embodiment of the present invention.

An inquiry receiving unit 167 for receiving an inquiry from the anonymity notifying apparatus 140, an input/output unit 168 for displaying an inquiry content on a screen of a displaying apparatus, and accepting a reply from the user, and a response transmitting unit 169 for transmitting the accepted response as a replay to the inquiry to the anonymity notifying apparatus 140 are installed in the communication device 111 as shown in FIG. 13. When the user A of the communication device 111-1 and the user B of the communication device 111-2 view the inquiry content to be displayed in the screen, and input either permission (OK) or non-permission (NG), it is send out to the anonymity notifying apparatus 140 from the communication device 111-1 and the communication device 111-2 ((24) and (25) of FIG. 12).

The notification/non-notification inquiring unit 148 of the anonymity notifying apparatus 140 conveys a response result coming from the communication device 111-1 and the communication device 111-2 to the notifying unit 147 ((26) of FIG. 12). The notifying unit 147 finally judges whether or not the notification is enabled based upon this response result. Herein, the notifying unit 147 judges that the notification is not enabled when a response of non-permission is issued from both of the communication device 111-1 and the communication device 111-2, and judges that the notification is enabled when a response of permission is issued from both of the communication device 111-1 and the communication device 111-2. When only one of the communication device 111-1 and the communication device 111-2 issues a response of permission of the notification, the notifying unit 147 judges that only the anonymity of the communication device from which a response of permission of the notification has been issued may be notified. The notifying unit 147 transmits the notification information including the anonymity of which the notification has been permitted as a result of the final judgment to the third party device 151-1 ((27) of FIG. 12).

The third party device 151-1, upon receipt of the notification information by the notification information receiving unit 161 shown in FIG. 10, presents the notification information to the user X by displaying on the display screen by the displaying unit 162, outputting in a voice form by the voice generating unit 163, and outputting in a vibration form by the vibration generating unit 164.

Thereafter, after the communication between the communication device 111-1 and the communication device 111-2 is finished, the communication establishing unit 131 of the anonymous communication establishing apparatus 130 releases the communication session established between the communication device 111-1 and the communication device 111-2. Further, the communication establishing unit 131 designates the identifier of the caller/callee anonymity management information transmitted to the anonymity notifying apparatus 140 at the time of establishing this communication session, and requests the managing unit 143 of the anonymity notifying apparatus 140 via the network 160 to delete the caller/callee anonymity management information. The managing unit 143, in response to this request, deletes the corresponding caller/callee anonymity management information from the caller/callee anonymity management information temporarily-preserving unit 141. For this, a response saying the effect that the communication device 11'-1 and the communication device 111-2 are not making the communication is returned even though the anonymity notification request for defining the communication device 111-1 and the communication device 111-2 as a monitoring target, respectively, is issued from the third party device 151 to the anonymity notifying apparatus 140 because the corresponding anonymity management information of the caller or the callee is not preserved in the caller/callee anonymity management information temporarily-preserving unit 141.

Next, an effect of this exemplary embodiment will be explained.

In accordance with this exemplary embodiment, an effect similar to that of the second embodiment is obtained, and simultaneously therewith, after obtaining the permission by the communication parties that are making the anonymous communication, the anonymities of the above communication parties can be notified to the third party.

Fourth Exemplary Embodiment

Figure 14:
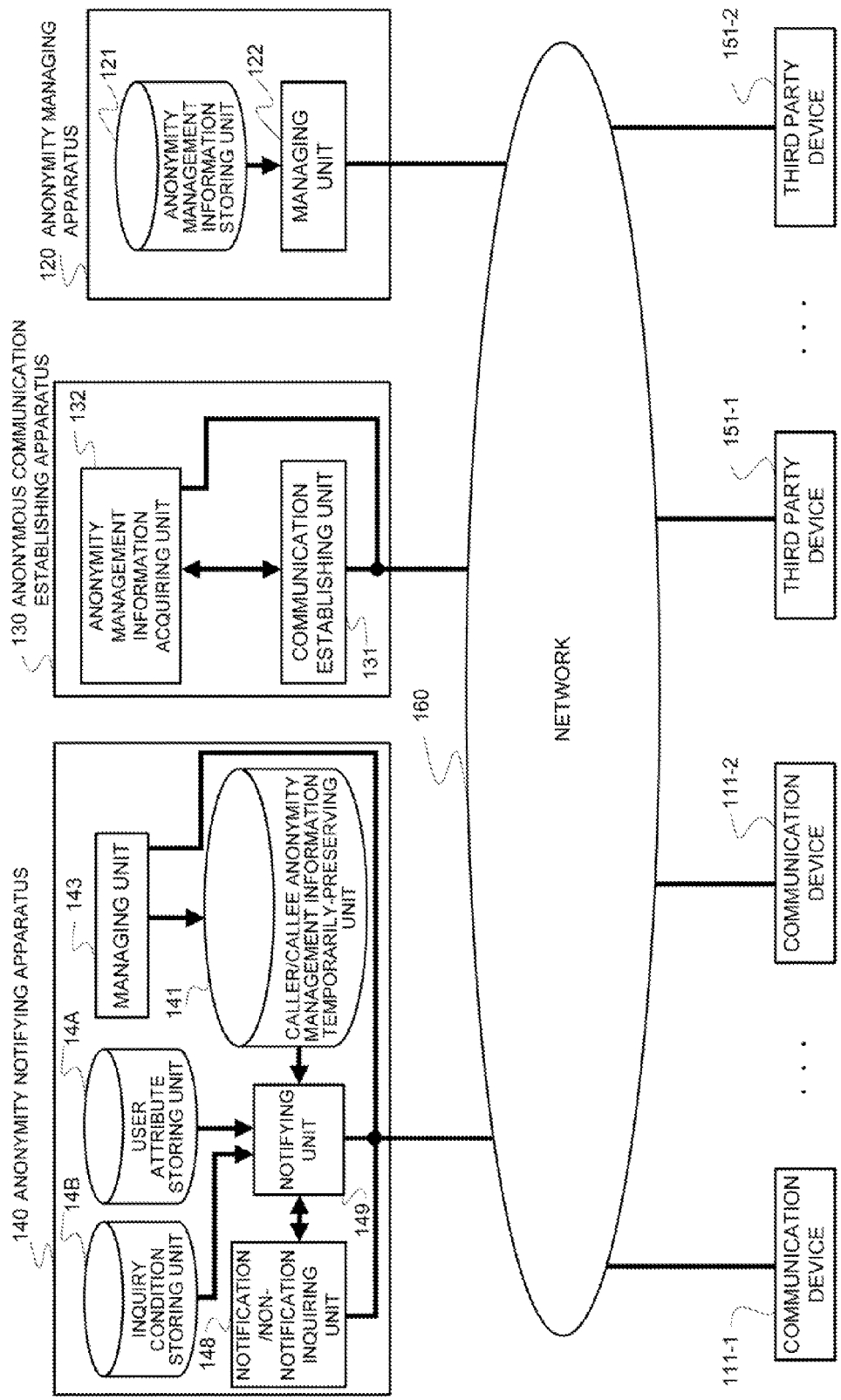
FIG. 14 is a block diagram of the anonymous communication system related to a fourth exemplary embodiment of the present invention.

Upon making a reference to FIG. 14, an anonymous communication system 400 related to the fourth exemplary embodiment of the present invention, as compared with the anonymous communication system 300 related to the third exemplary embodiment shown in FIG. 11, differs in a point of newly including a user attribute storing unit 14A and an inquiry condition storing unit 14B within the anonymity notifying apparatus 140, and in a point of including a notifying unit 149 instead of the notifying unit 147, and is identical in other points to the anonymous communication system 300 related to the third exemplary embodiment.

The notifying unit 149, as compared with the notifying unit 147 of the third exemplary embodiment, differs in a point of, prior to notifying the anonymity of the communication device 111 to the third party device 151 according to the anonymity notification request received from the third party device 151, judging whether there is a necessity for the inquiry as to whether or not the above notification is enabled by making a reference to the user attribute storing unit 14A and the inquiry condition storing unit 14B, and inquiring of the communication device 111 only when there is a necessity for the inquiry.

The user attribute storing unit 14A, as shown in FIG. 15, is a database for storing ages of the users of the communication device 111 corresponding to the real addresses of the communication device 111. Additionally, by incorporating information of ages of the users of the communication device 111 into the anonymity management information to be managed by the anonymity managing apparatus 120, it is also possible to omit the user attribute storing unit 14A. In this case, the notifying unit 149 acquires the ages of the users by making a reference to the anonymity management information within the caller/callee anonymity management information temporarily-preserving unit 141 because the anonymity management information including the ages of the users who are making the anonymous communication is preserved in the caller/callee anonymity management information temporarily-preserving unit 141.

The inquiry condition storing unit 14B is a means for storing the age defined to be an inquiry threshold as shown in FIG. 16. In this example, the threshold indicating that the inquiry is required when the user of the communication device, being an inquiry destination, is thirteen years old or more is set.

An operation of this embodiment will be explained.

An operation of an anonymous communication system 400 related to this exemplary embodiment is identical to that of the anonymous communication system 300 related to the third exemplary embodiment except for an operation of the notifying unit 149. The notifying unit 149, upon receipt of the anonymity notification request as shown in FIG. 8(b) via the network 160 from the third party device 151, retrieves the caller anonymity management information including the real address of the communication device designated to be a monitoring target by the anonymity notification request, and the callee anonymity management information from the caller/callee anonymity management information temporarily-preserving unit 141. The caller anonymity management information of the first line is retrieved with the case of the anonymity notification request of FIG. 8(b) when the caller/callee anonymity management information temporarily-preserving unit 141 has the content shown in FIG. 3 because the real address of the communication device, being a monitoring target, is sip:101@example.com. Next, the notifying unit 149 evaluates the notification condition within the anonymity notification request, and determines whether or not the notification is enabled. The notifying unit 149 determines that the notification is enabled with the case of the anonymity notification request of FIG. 8(b) because the notification condition, which is "the case of the caller", meets this-time condition that the communication device 111-1 is the caller device.

Next, the notifying unit 149 makes a reference to the anonymity of the communication device, being a notification target of the anonymity, which is included in the caller anonymity management information, confirms that the notification target of the anonymity is the caller device and the callee device, and decides both of the communication device 111-1, being the caller device, and the communication device 111-2, being the callee device, to be an inquiry destination, respectively.

Next, the notifying unit 149 searches the user attribute storing unit 14A with the real address of the communication device 11 as a key, acquires the age of the user A "20 years old", and determines that the inquiry is required by comparing it with the inquiry threshold "13 years old or more" stored in the inquiry condition storing unit 14B. Further, the notifying unit 149 searches the user attribute storing unit 14A with the real address of the communication device 111-2 as a key, acquires the age of the user B "12 years old", and determines that the inquiry is not required by comparing it with the inquiry threshold "13 years old or more" stored in the inquiry condition storing unit 14B. The notifying unit 149, based upon these judgment results, delivers the real address of the third party device 151-1 within the anonymity notification request and the real address of the communication device 111-1 as anonymity notification destination information and as inquiry destination information, respectively, to the notification/non-notification inquiring unit 148 in order to inquire only of the communication device 111-1, and gives an instruction the inquiry.

The notification/non-notification inquiring unit 148 inquires of the communication device 111-1 as to whether its anonymity may be notified to the third party device via the network 160 by indicating the real address of the third party device. At this time, the anonymous address may be incorporated in the inquiry. And, the notification/non-notification inquiring unit 148 conveys a response result coming from the communication device 111-1 to the notifying unit 149.

The notifying unit 149 finally judges whether or not the notification is enabled based upon this response result.

Herein, the notifying unit 149 judges the notification is enabled when a response of permission is issued from the communication device 111-1 inquired about the notification. When a response of non-permission is issued from the communication device 111-1 inquired about the notification, the notifying unit 147 judges that, for example, only the anonymity of the communication device 111-2, of which the inquiry has been judged to be unnecessary, may be notified. The notifying unit 149 transmits the notification information including the anonymity of which the notification has been permitted as a result of the final judgment to the third party device 151-1.

Next, an effect of this exemplary embodiment will be explained.

In accordance with this exemplary embodiment, an effect similar to that of the second embodiment is obtained, and simultaneously therewith, after obtaining the permission by the communication parties that are making the anonymous communication, the anonymities of the above communication parties can be notified to the third party. Further, it is possible to inquire of only the communication parties satisfying the pre-set inquiry condition.

Fifth Exemplary Embodiment

Figure 17:
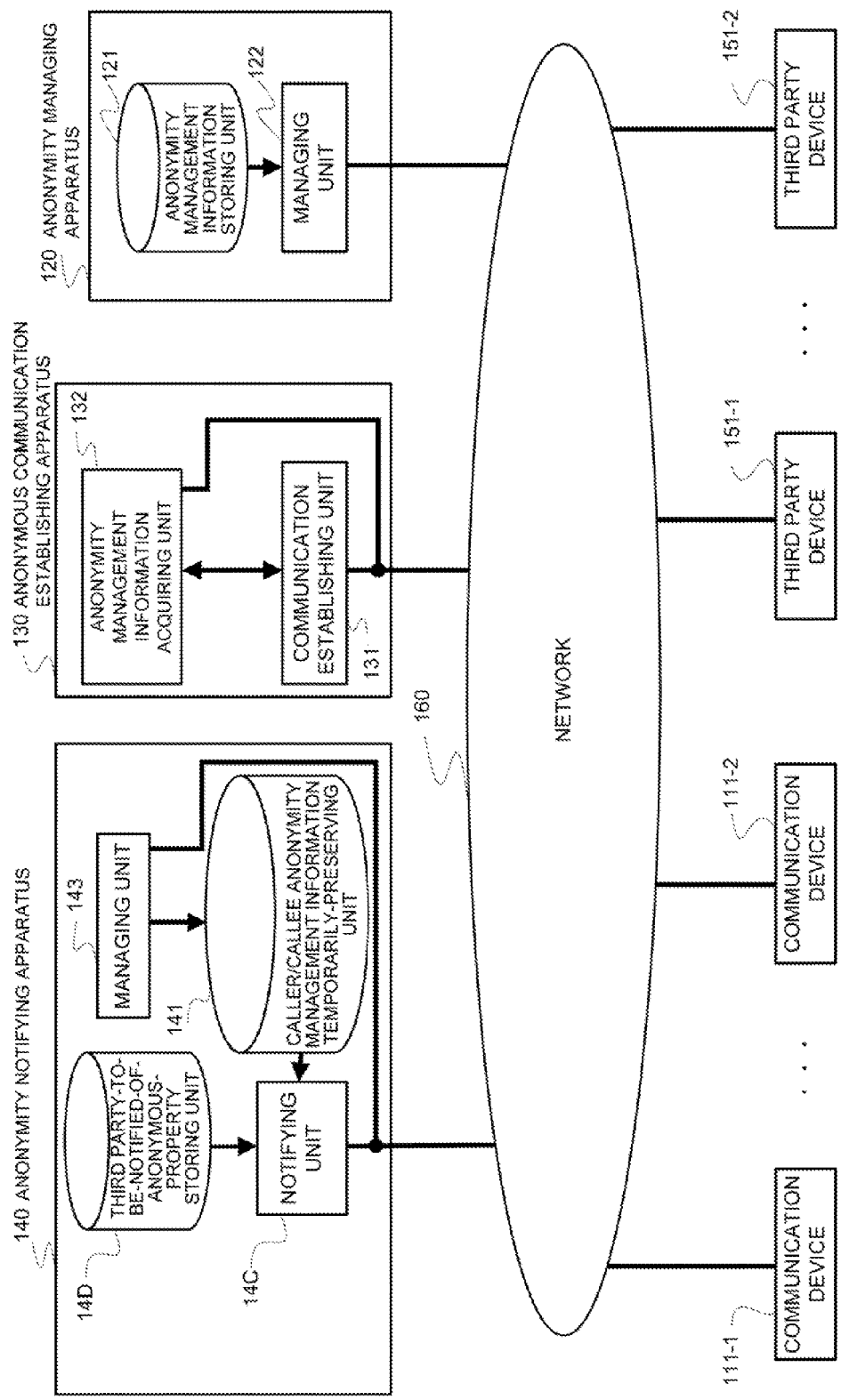
FIG. 17 is a block diagram of the anonymous communication system related to a fifth exemplary embodiment of the present invention.

Upon making a reference to FIG. 17, an anonymous communication system 500 related to the fifth exemplary embodiment of the present invention, as compared with the anonymous communication system 200 related to the second exemplary embodiment shown in FIG. 7, differs in a point of newly including a third party-to-be-notified-of-anonymity storing unit 14D within the anonymity notifying apparatus 140, and in a point of including a notifying unit 14C instead of the notifying unit 146, and is identical in other points to the anonymous communication system 200 related to the second exemplary embodiment.

Figure 18:
FIG. 18 is a view illustrating an example of data stored in a third party-to-be-notified-of-anonymity storing unit in the fifth exemplary embodiment of the present invention.

The third party-to-be-notified-of-anonymity storing unit 14D, as shown in FIG. 18, is a database for storing a list of the third party devices (a list of the real addresses) to which the anonymity of the anonymous address of the communication device 111 may be notified corresponding to the real addresses of the communication device 111. Additionally, by incorporating the real address of the third party devices to which the anonymity may be notified into the anonymity management information to be managed by the anonymity managing apparatus 120, it is also possible to omit the third party-to-be-notified-of-anonymity storing unit 14D. In this case, the notifying unit 14C acquires the real addresses of the third party devices to which the anonymities may be notified by making a reference to the anonymity management information within the caller/callee anonymity management information temporarily-preserving unit 141 because the anonymity management information including the real addresses of the third party devices, to which the anonymities of the communication parties that are making the anonymous communication may be notified, are preserved in the caller/callee anonymity management information temporarily-preserving unit 141.

The notifying unit 14C, as compared with the notifying unit 146 of the second exemplary embodiment, differs in a point of, before notifying the anonymity of the communication device 111 to the third party device 151 according to the anonymity notification request received from the third party device 151, judging whether the anonymity of the above communication device 111 may be notified to the above third party device 151 by making a reference to the third party-to-be-notified-of-anonymity storing unit 14D.

An operation of this embodiment will be explained.

An operation of an anonymous communication system 500 related to this exemplary embodiment is identical to that of the anonymous communication system 200 related to the second exemplary embodiment except for an operation of the notifying unit 14C. The notifying unit 14C, upon receipt of the anonymity notification request as shown in FIG. 8(b) from the third party device 151 via the network 160, retrieves the caller anonymity management information including a real address identical to the real address of the communication device, being a monitoring target, within the anonymity notification request, and the callee anonymity management information from the caller/callee anonymity management information temporarily-preserving unit 141. The caller anonymity management information of the first line is retrieved with the case of the anonymity notification request of FIG. 8(b) when the caller/callee anonymity management information temporarily-preserving unit 141 has the content shown in FIG. 3 because the real address of the communication device, being a monitoring target, is sip:101@example.com. Next, the notifying unit 14C evaluates the notification condition within the anonymity notification request, and determines whether or not the notification id enabled. The notifying unit 14C determines that the notification is enabled with the case of the anonymity notification request of FIG. 8(b) because the notification condition, which is "the case of the caller", meets this-time condition that the communication device 111-1 is the caller device.

Next, the notifying unit 14C makes a reference to the anonymity of the communication device, being a notification target of the anonymity, which is included in the caller anonymity management information, confirms that the notification target of the anonymity is the caller device and the callee device, and judges whether or not the notification is enabled for both of the communication device 111-1, being a caller device, and the communication device 111-2, being a callee device, based upon the third party-to-be-notified-of-anonymity storing unit 14D.

At first, the notifying unit 14C searches the third party-to-be-notified-of-anonymity storing unit 14D with the real address of the communication device 111-1 as a key, and acquires a list of the third party devices to which the anonymity may be notified, which correspond to the communication devices 111-1. And, the notifying unit 14C judges whether the notification of the anonymity of the communication device 111-1 to the third party device 151-1 is permitted by investigating whether or not the real address of the third party device 151-1, being a notification destination, is included in this list. The notifying unit 14C judges that the notification is enabled because the real address sip:301@example.com of the third party device 151-1 is registered correspondingly to the real address sip:101@example.com of the communication device 111-1 in the third party-to-be-notified-of-anonymity storing unit 14D of FIG. 18.

Next, the notifying unit 14C searches the third party-to-be-notified-of-anonymity storing unit 14D with the real address of the communication device 111-2 as a key, and acquires a list of the third party devices to which the anonymity may be notified, which correspond to the communication devices 111-2. And, the notifying unit 14C judges whether the notification of the anonymity of the communication device 111-2 to the third party device 151-1 is permitted by investigating whether or not the real address of the third party device 151-1, being a notification destination, is included in this list. The notifying unit 14C judges that notification is not enabled because the real address sip:301@example.com of the third party device 151-1 is not registered correspondingly to the real address sip:101@example.com of the communication device 111-2 in the third party-to-be-notified-of anonymity storing unit 14D of FIG. 18.

The notifying unit 14C transmits the notification information including the anonymity of which notification has been permitted to the third party device 151-1 based upon these judgment results.

Next, an effect of this exemplary embodiment will be explained.

In accordance with this exemplary embodiment, an effect similar to that of the second embodiment is obtained, and simultaneously therewith, it becomes possible to notify to only the third party devices having received the permission by communication parties that are making the anonymous communication the anonymities of the above communication parties.

Other Exemplary Embodiments

The present invention is not limited to the exemplary embodiments mentioned above, and the following various additions/modifications hereto are enabled.

While the explanation was made in the exemplary embodiments mentioned above on the assumption that the anonymous address corresponding to the real address of the communication device was pre-generated and stored in the anonymity managing apparatus 120, it may be dynamically generated. In this case, for example, a function of generating the anonymous address from the real address of the communication device is installed into the managing unit 122 of the anonymity managing apparatus 120. When having received a request for acquiring the anonymity management information including the real address from the anonymity management information acquiring unit 132 of the anonymous communication establishing apparatus 130, the managing unit 122 generates the anonymous address having a desired anonymity from the received real address, registers the anonymity management information, which is configured of the real address, the foregoing generated anonymous address, and the anonymity, to the anonymity management information storing unit 121, and simultaneously therewith, transmits it to the anonymity management information acquiring unit 132 in a case where the corresponding anonymity management information does not exist in the anonymity management information storing unit 121, or in a case where the anonymous address different from the previous one needs to be generated even though the corresponding anonymity management information exists because the anonymity is, for example, unlinkability.

While the explanation was made in the exemplary embodiments mentioned above on the assumption that the anonymity management information of all of the communication devices was managed by one anonymity managing apparatus 120, they may be dispersedly managed by a plurality of the anonymity managing apparatuses 120.

While one anonymous communication establishing apparatus 130 recognized the real address of the caller communication device and the real address of the callee communication device, and established the communication session between both of the communication devices in the exemplary embodiments mentioned above, a plurality of the anonymous communication establishing apparatuses may sharedly establish the communication session so that the real addresses of both of the caller and the callee do not become known to one anonymous communication establishing apparatus. Specifically, a first anonymous communication establishing apparatus having received the communication connection request including the real address of the caller and the anonymous address of the callee from the communication device of the caller establishes the communication session with the communication device that is specified by the real address of the caller, and transmits the anonymous address of the communication device of the callee, and the anonymous address of the caller within the anonymity management information of the caller acquired from the anonymity managing apparatus to a second anonymous communication establishing apparatus. The second anonymous communication establishing apparatus acquires the anonymity management information including the real address corresponding to the anonymous address of the callee from the anonymity management information, and establishes the communication session with the communication device that is specified by the real address of the callee. Finally, the communication session established by the first anonymous communication establishing apparatus, and the communication session established by the second anonymous communication establishing apparatus are linked, and the communication session in use for the communication between the caller and the callee is generated.

While the explanation was made in the exemplary embodiments mentioned above on the assumption that the anonymity notifying apparatus 140 was an apparatus physically different from the anonymous communication establishing apparatus 130, they may be mounted into an identical computer. In this case, the communication between the anonymous communication establishing apparatus 130 and the anonymity notifying apparatus 140 may be made with an interprocess communication within the computer.

Figure 19:
FIG. 19 is a view illustrating another example of data stored in the anonymity management information storing unit.

While the explanation was made in the exemplary embodiments mentioned above on the assumption that the anonymous address of the communication device corresponded to the real address on a one-to-one basis, a plurality of the anonymous addresses may correspond to one real address. In this case, all of the anonymities may coincide with each other, and the anonymities may differ from each other partially or completely. Further, the anonymous addresses may be used properly according to the anonymous address of the communication partner. FIG. 19 shows an example of the anonymity management information in which two anonymous addresses of sip:anonym-1-1®example.com and sip:anonym-1-2@example.com correspond to the communication device having sip:101@example.com as a real address. In this example, the setting is made so that sip:anonym-1-1@example.com is used when the anonymous address of the communication partner is sip:anonym-2-1@example.com, and sip:anonym-1-2@example.com is used when the anonymous address of the communication partner is sip:anonym-2-2@example.com. In a case of using such anonymity management information, for example, when making a request for acquiring the anonymity management information including the real address of the communication device of the caller, the anonymous communication establishing apparatus 130 designates the anonymous address (for example, it is assumed that the anonymous address is sip:anonym-2-1@example.com) as well of the callee, being a communication partner, during the request. The managing unit 122 of the anonymity managing apparatus 120 retrieves the anonymity management information having the real address sip:101®example.com of the caller designated by the acquirement request, and yet having the anonymous address of the communication partner (callee) designated during the request from the anonymity management information storing unit 121. Thus, with the case of FIG. 19, the anonymity management information of the first line is retrieved and sent to the anonymous communication establishing apparatus 130.

While the explanation was made in the exemplary embodiments mentioned above on the assumption that one communication device made one anonymous communication only with the other one communication device, it is also possible for one communication device to simultaneously make the anonymous communications with a plurality of the other communication devices. At that moment, as shown in FIG. 19, the different anonymous address may be used for each communication partner. At this time, when the anonymity notification request for defining the above one communication device as a monitoring target is issued from the third party device, for all of the anonymous communications that the above one communication device is currently making, the anonymities of the above communication parties (either the caller or the callee, or both thereof) may be notified to the third party device.

While the explanation was made in the exemplary embodiments mentioned above on the assumption that it is with only the other one communication device that one communication device simultaneously made the anonymous communication, it is also possible for one communication device to simultaneously establish a plurality of the communication sessions with the other one communication device, and to simultaneously make a plurality of the anonymous communications by using the anonymous addresses each having the identical anonymity, or the anonymous addresses each having the different anonymity for each anonymous communication. At this time, when the anonymity notification request for defining the above one communication device as a monitoring target is issued from the third party device, for all of the anonymous communications that the above one communication device is currently making with the other one communication device, the anonymity of either the above caller or the above callee, or the anonymities of both may be notified to the third party device. At this time, the anonymous addresses in use for individual anonymous communications, and session identifiers, which are given to respective communication sessions by the anonymous communication establishing apparatus 130 in order to identify individual anonymous communications, may be notified to the third party device together therewith.

Further, while, needless to say, each function that the anonymous communication establishing apparatus, the anonymity managing apparatus, the anonymity notifying apparatus, the communication device, and the third party device of each of the foregoing embodiments have can be realized in a hardware manner, it can be realized with a computer and a program.

In the system of the anonymous communication that is made between the communication devices such as the mobile telephone machines via Internet and Next Generation Network (NGN), the present invention is applicable to the system in which the third party confirms the anonymity of the anonymous communication, and the method thereof.

As mentioned above, a first aspect of the present invention, which is an anonymous communication system enabling a communication by anonymity, is characterized in detecting anonymities of communication parties and notifying them to a third party device other than communication devices of the communication parties.

A second aspect of the present invention is characterized in, in the above-mentioned aspect, including: an anonymity managing means for retaining anonymity management information including a real address, an anonymous address and an anonymity of the communication device; an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information; and an anonymity notifying means for acquiring the anonymity of at least one of the communication parties of the caller device and the callee device that perform the communication through the communication session to be established by the foregoing anonymous communication establishing means from the foregoing anonymity management information, and notifying it to the third party device other than the caller device and the callee device.

A third aspect of the present invention is characterized in, in the above-mentioned aspect, including a caller/callee anonymity management information temporarily-preserving unit for preserving the forgoing anonymity management information acquired by the foregoing anonymous communication establishing means during a period that the communication session established between the caller device and the callee device is active, wherein the foregoing anonymity notifying means acquires the anonymity of at least one of the communication parties of the caller device and the callee device from the foregoing anonymity management information stored in the foregoing caller/callee anonymity management information temporarily-preserving unit.

A fourth aspect of the present invention is characterized in, in the above-mentioned aspect, including a notification control information storing means for storing notification control information including designation information of the communication device, being a monitoring target, and anonymity notification destination information, wherein the foregoing anonymity notifying means retrieves the notification control information, which designates the communication device for performing the communication through the communication session to be established by the foregoing anonymous communication establishing means as a monitoring target, from the foregoing notification control information storing means, and notifies the anonymity of at least one of the communication parties of the caller device and the callee device to an anonymity notification destination to be included in the above retrieved notification control information.

A fifth aspect of the present invention is characterized in, in the above-mentioned aspect, including a notification control information storing means for storing notification control information including designation information of the communication device, being a monitoring target, anonymity notification destination information, and notification conditions, wherein the foregoing anonymity notifying means retrieves the notification control information, which designates the communication device for performing the communication through the communication session to be established by the foregoing anonymous communication establishing means as a monitoring target, from the foregoing notification control information storing means, determines whether or not the notification condition to be included in the above retrieved notification control information holds, and notifies the anonymity of at least one of the communication parties of the caller device and the callee device to an anonymity notification destination to be included in the above retrieved notification control information when the notification condition holds.

A sixth aspect of the present invention is characterized in, in the above-mentioned aspect, including a notification control information storing means for storing notification control information including designation information of the communication device, being a monitoring target, anonymity notification destination information, and designation information of the communication party, being a notification target of the anonymity, wherein the foregoing anonymity notifying means retrieves the notification control information, which designates the communication device for performing the communication through the communication session to be established by the foregoing anonymous communication establishing means as a monitoring target, from the foregoing notification control information storing means, and notifies the anonymity of the communication party to be designated by the designation information of the communication party, being a notification target of the anonymity, which is included in the foregoing retrieved notification control information, out of the communication parties of the caller device and the callee device, to an anonymity notification destination to be included in the above retrieved notification control information.

A seventh aspect of the present invention is characterized in, in the above-mentioned aspect, including a notification control information storing means for storing notification control information including designation information of the communication device, being a monitoring target, anonymity notification destination information, designation information of the communication party, being a notification target of the anonymity, and notification conditions, wherein the foregoing anonymity notifying means retrieves the notification control information, which designates the communication device for performing the communication through the communication session to be established by the foregoing anonymous communication establishing means as a monitoring target, from the foregoing notification control information storing means, determines whether or not the notification condition to be included in the above retrieved notification control information holds, and notifies the anonymity of the communication party to be designated by the designation information of the communication party, being a notification target of the anonymity, which is included in the foregoing retrieved notification control information, out of the communication parties of the caller device and the callee device, to an anonymity notification destination to be included in the foregoing retrieved notification control information when the notification condition holds.

An eighth aspect of the present invention is characterized in that, in the above-mentioned aspect, the foregoing anonymity notifying means receives, from the foregoing third party device, an anonymity notification request for requesting a notification of the anonymity of at least one device, out of the caller device and the callee device that are performing the communication through the communication session to be established by the foregoing anonymous communication establishing means, acquires the anonymity requested by the above anonymity notification request from the foregoing anonymity management information, and notifies it to the foregoing third party device.

A ninth aspect of the present invention is characterized in that in the above-mentioned aspect, the foregoing anonymity notification request includes designation information of the communication device, being a monitoring target, and anonymity notification destination information, and the foregoing anonymity notifying means detects an anonymous communication in which the communication device to be designated by the foregoing designation information of the communication device, being a monitoring target, participates as the caller device or the callee device, out of the anonymous communications that are being performed through the communication session to be established by the foregoing anonymous communication establishing means, acquires the anonymity of at least one of the communication parties of the caller device and the callee device in the above detected anonymous communication from the foregoing anonymity management information, and notifies it to the device to be designated by the foregoing anonymity notification destination information.

A tenth aspect of the present invention is characterized in that in the above-mentioned aspect, the foregoing anonymity notification request includes designation information of the communication device, being a monitoring target, anonymity notification destination information, and notification conditions, and the foregoing anonymity notifying means detects an anonymous communication in which the communication device to be designated by the foregoing designation information of the communication device, being a monitoring target, participates as the caller device or the callee device, out of the anonymous communications that are being performed through the communication session to be established by the foregoing anonymous communication establishing means, determines whether or not the above detected anonymous communication satisfies the notification condition within the foregoing anonymity notification request, acquires the anonymity of at least one of the communication parties of the calle device and the callee device in the foregoing detected anonymous communication from the foregoing anonymity management information when it satisfies the notification condition, and notifies it to the device to be designated by the foregoing anonymity notification destination information.

An eleventh aspect of the present invention is characterized in that in the above-mentioned aspect, the foregoing anonymity notification request includes designation information of the communication device, being a monitoring target, anonymity notification destination information, and designation information of the communication party, being a notification target of the anonymity, and the foregoing anonymity notifying means detects an anonymous communication in which the communication device to be designated by the foregoing designation information of the communication device, being a monitoring target, participates as the caller device or the callee device, out of the anonymous communications that are being performed through the communication session to be established by the foregoing anonymous communication establishing means, acquires the anonymity the communication party to be designated by the designation information of the communication party, being a notification target of the anonymity, within the foregoing anonymity notification request, out of the communication parties of the caller device and the callee device in the foregoing detected anonymous communication, from the foregoing anonymity management information, and notifies it to the device to be designated by the foregoing anonymity notification destination information.

A twelfth aspect of the present invention is characterized in that in the above-mentioned aspect, the foregoing anonymity notification request includes designation information of the communication device, being a monitoring target, anonymity notification destination information, designation information of the communication party, being a notification target of the anonymity, and notification conditions, and the foregoing anonymity notifying means detects an anonymous communication in which the communication device to be designated by the foregoing designation information of the communication device, being a monitoring target, participates as the caller device or the callee device, out of the anonymous communications that are being performed through the communication session to be established by the foregoing anonymous communication establishing means, determines whether or not the above detected anonymous communication satisfies the notification condition within the foregoing anonymity notification request, acquires the anonymity of the communication party to be designated by the designation information of the communication party, being a notification target of the anonymity, within the foregoing anonymity notification request, out of the communication parties of the caller device and the callee device in the foregoing detected anonymous communication, from the foregoing anonymity management information when it satisfies the notification condition, and notifies it to the device to be designated by the foregoing anonymity notification destination information.

A thirteenth aspect of the present invention is characterized in that in the above-mentioned aspect, the foregoing anonymity notifying means inquires of the communication device as to whether the anonymity may be notified to the third party, and judges whether or not the anonymity may be notified based upon a response result thereof.

A fourteenth aspect of the present invention is characterized in that in the above-mentioned aspect, the foregoing anonymity notifying means compares attribute information of a user of the communication device, being an inquiry destination, with an pre-set inquiry condition, and judges whether or not the inquiry is required based upon a comparison result thereof.

A fifteenth aspect of the present invention is characterized in that in the above-mentioned aspect, the foregoing anonymity notifying means judges whether or not the anonymity may be notified by making a reference to a list of the third party devices to which the anonymity may be notified.

A sixteenth aspect of the present invention, which is an anonymous communication method enabling a communication by anonymity, is characterized in detecting anonymities of communication parties, and notifying them to a third party device other than communication devices of the communication parties.

A seventeenth aspect of the present invention is characterized in, in the above-mentioned aspect, including: (a) an anonymous communication establishing step in which an anonymous communication establishing means acquires anonymity management information of a caller device and anonymity management information of a callee device from an anonymity managing means for retaining anonymity management information including a real address, an anonymous address and an anonymity of the communication device when having received a communication connection request designating the callee device from the caller device, establishes a communication session between the caller device and the callee device, and decides which address, out of the real address and the anonymous address, should be used as an address of the caller device to be notified to the callee device responding to the anonymity of the caller device to be included in the foregoing acquired anonymity management information; and (b) an anonymity notifying step in which an anonymity notifying means acquires the anonymity of at least one of the communication parties of the caller device and the callee device that perform the communication through the communication session to be established by the foregoing anonymous communication establishing step from the foregoing anonymity management information, and notifies it to the third party device other than the caller device and the callee device.

An eighteenth aspect of the present invention, which is an anonymity notifying apparatus to be installed in an anonymous communication system enabling a communication by anonymity, is characterized in detecting anonymities of communication parties, and notifying them to a third party device other than communication devices of the communication parties.

A nineteenth aspect of the present invention, which is, in the above-mentioned aspect, an anonymity notifying apparatus to be installed in an anonymous communication system for including: an anonymity managing means for retaining anonymity management information including a real address, an anonymous address and the anonymity of the communication device; and an anonymous communication establishing means for acquiring the anonymity management information of a caller device and the anonymity management information of a callee device from the foregoing anonymity managing means when having received a communication connection request designating the callee device from the caller device, establishing the communication session between the caller device and the callee device, and deciding which address, out of the real address and the anonymous address, should be used as an address of the caller device to be notified to the callee device responding to the anonymity of the caller device to be included in the foregoing acquired anonymity management information, is characterized in including a notifying means for acquiring the anonymity of at least one of the communication parties of the caller device and the callee device that perform the communication through the communication session to be established by the foregoing anonymous communication establishing means from the foregoing anonymity management information, and notifying it to the third party device other than the caller device and the callee device.

A twentieth aspect of the present invention, which is a communication device constituting, in an anonymous communication system for including: an anonymity managing means for retaining anonymity management information including a real address, an anonymous address and an anonymity of a communication device; an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information; and an anonymity notifying apparatus for acquiring the anonymity of at least one of the communication parties of the caller device and the callee device that perform the communication through the communication session to be established by the above anonymous communication establishing means from the foregoing anonymity management information, and notifying it to a third party device other than the caller device and the callee device, the foregoing third party device, is characterized in including a means for receiving the foregoing notification information to be notified from the foregoing anonymity notifying apparatus, and outputting the anonymity to be shown by the foregoing notification information in one of a character output form, a voice output form, and a vibration output form, or a plurality of output forms.

A twenty-first aspect of the present invention causes a computer constituting an anonymity notifying apparatus to be installed in an anonymous communication system for including: an anonymity managing means for retaining anonymity management information including a real address, an anonymous address and an anonymity of a communication device; and an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information to function as a notifying means for acquiring the anonymity of at least one of the communication parties of the caller device and the callee device that perform the communication through the communication session to be established by the foregoing anonymous communication establishing means from the foregoing anonymity management information, and notifying it to a third party device other than the caller device and the callee device.

A twenty-second aspect of the present invention causes a computer constituting a communication device in a anonymous communication system for including: an anonymity managing means for retaining anonymity management information including a real address, an anonymous address and an anonymity of a communication device; an anonymous communication establishing means for acquiring the anonymity management information of a caller device and the anonymity management information of a callee device from the foregoing anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in the foregoing acquired anonymity management information; and an anonymity notifying apparatus for acquiring the anonymity of at least one of the communication parties of the caller device and the callee device performing the communication through the communication session to be established by the above anonymous communication establishing means from the foregoing anonymity management information, and notifying it to the third party device other than the caller device and the callee device, the foregoing communication device being the foregoing third party device, to function as a means for receiving the foregoing notification information to be notified from the foregoing anonymity notifying apparatus, and outputting the anonymity to be shown by the foregoing notification information in one of a character output form, a voice output form, and a vibration output form, or a plurality of output forms.

Above, while the present invention has been particularly shown and described with reference to exemplary embodiments and exemplary examples thereof, the present invention is not limited to the above mentioned exemplary embodiments and exemplary examples. It will be understood by those of ordinary skill in the art that various changes in form and details may be made therein without departing from the spirit and scope of the present invention as defined by the claims.

REFERENCE SIGNS LIST

100, 200, 300, 400, and 500 anonymous communication systems
110 and 111 communication devices
120 anonymity managing apparatus
130 anonymous communication establishing apparatus
140 anonymity notifying apparatus
150 and 151 third party devices
160 network

The invention claimed is:

1. An anonymous communication system enabling a communication by anonymity, said anonymous communication system detecting anonymities of communication parties and notifying them to a third party device other than communication devices of the communication parties, the system comprising:

an anonymity managing means for retaining anonymity management information including a real address, an anonymous address and an anonymity of the communication device;

an anonymous communication establishing means for acquiring the anonymity management information of a caller device and the anonymity management information of a callee device from said anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in said acquired anonymity management information; and an anonymity notifying means for acquiring the anonymity of at least one of the communication parties of the caller device and the callee device that make the communication through the communication session to be established by said anonymous communication establishing means from said anonymity management information, and notifying it to the third party device other than the caller device and the callee device.

2. An anonymous communication system according to claim 1, comprising a caller/callee anonymity management information temporarily-preserving unit for preserving the said anonymity management information acquired by said anonymous communication establishing means during a period that the communication session established between the caller device and the callee device is active, wherein said anonymity notifying means acquires the anonymity of at least one of the communication parties of the caller device and the callee device from said anonymity management information stored in said caller/callee anonymity management information temporarily-preserving unit.

3. An anonymous communication system according to claim 1, comprising a notification control information storing means for storing notification control information including designation information of the communication device, being a monitoring target, and anonymity notification destination information, wherein said anonymity notifying means retrieves the notification control information, which designates the communication device for making the communication through the communication session to be established by said anonymous communication establishing means as a monitoring target, from said notification control information storing means, and notifies the anonymity of at least one of the communication parties of the caller device and the callee device to an anonymity notification destination to be included in the above retrieved notification control information.

4. An anonymous communication system according to claim 1, comprising a notification control information storing means for storing notification control information including designation information of the communication device, being a monitoring target, anonymity notification destination information, and notification conditions, wherein said anonymity notifying means retrieves the notification control information, which designates the communication device for making the communication through the communication session to be established by said anonymous communication establishing means as a monitoring target, from said notification control information storing means, determines whether or not the notification condition to be included in the above retrieved notification control information holds, and notifies the anonymity of at least one of the communication parties of the caller device and the callee device to an anonymity notification destination to be included in said retrieved notification control information when the notification condition holds.

5. An anonymous communication system according to claim 1, comprising a notification control information storing means for storing notification control information including designation information of the communication device, being a monitoring target, anonymity notification destination information, and designation information of the communication party, being a notification target of the anonymity, wherein said anonymity notifying means retrieves the notification control information, which designates the communication device for making the communication through the communication session to be established by said anonymous communication establishing means as a monitoring target, from said notification control information storing means, and notifies the anonymity of the communication party to be designated by the designation information of the communication party, being a notification target of the anonymity, which is included in said retrieved notification control information, out of the communication parties of the caller device and the callee device, to an anonymity notification destination to be included in the above retrieved notification control information.

6. An anonymous communication system according to claim 1, comprising a notification control information storing means for storing notification control information including designation information of the communication device, being a monitoring target, anonymity notification destination information, designation information of the communication party, being a notification target of the anonymity, and notification conditions, wherein said anonymity notifying means retrieves the notification control information, which designates the communication device for making the communication through the communication session to be established by said anonymous communication establishing means as a monitoring target, from said notification control information storing means, determines whether or not the notification condition to be included in the above retrieved notification control information holds, and notifies the anonymity of the communication party to be designated by the designation information of the communication party, being a notification target of the anonymity, which is included in said retrieved notification control information, out of the communication parties of the caller device and the callee device, to an anonymity notification destination to be included in said retrieved notification control information when the notification condition holds.

7. An anonymous communication system according to claim 1, wherein said anonymity notifying means receives, from said third party device, an anonymity notification request for requesting a notification of the anonymity of at least one device, out of the caller device and the callee device that are making the communication through the communication session to be established by said anonymous communication establishing means, acquires the anonymity requested by the above anonymity notification request from said anonymity management information, and notifies it to said third party device.

8. An anonymous communication system according to claim 7:
 wherein said anonymity notification request includes designation information of the communication device, being a monitoring target, and anonymity notification destination information; and
 wherein said anonymity notifying means detects an anonymous communication in which the communication device to be designated by said designation information of the communication device, being a monitoring target, participates as the caller device or the callee device, out of the anonymous communications that are being made through the communication session to be established by said anonymous communication establishing means, acquires the anonymity of at least one of the communication parties of the caller device and the callee device in the above detected anonymous communication from said anonymity management information, and notifies it to the device to be designated by said anonymity notification destination information.

9. An anonymous communication system according to claim 7:
 wherein said anonymity notification request includes designation information of the communication device, being a monitoring target, anonymity notification destination information, and notification conditions; and
 wherein said anonymity notifying means detects an anonymous communication in which the communication device to be designated by said designation information of the communication device, being a monitoring target, participates as the caller device or the callee device, out of the anonymous communications that are being made through the communication session to be established by said anonymous communication establishing means, determines whether or not the above detected anonymous communication satisfies the notification condition within said anonymity notification request, acquires the anonymity of at least one of the communication parties of the caller device and the callee device in said detected anonymous communication from said anonymity management information when it satisfies the notification condition, and notifies it to the device to be designated by said anonymity notification destination information.

10. An anonymous communication system according to claim 7:
 wherein said anonymity notification request includes designation information of the communication device, being a monitoring target, anonymity notification destination information, and designation information of the communication party, being a notification target of the anonymity; and
 wherein said anonymity notifying means detects an anonymous communication in which the communication device to be designated by said designation information of the communication device, being a monitoring target, participates as the caller device or the callee device, out of the anonymous communications that are being made through the communication session to be established by said anonymous communication establishing means, acquires the anonymity of the communication party to be designated by the designation information of the communication party, being a notification target of the anonymity, within said anonymity notification request, out of the communication parties of the caller device and the callee device in the above detected anonymous communication, from said anonymity management information, and notifies it to the device to be designated by said anonymity notification destination information.

11. An anonymous communication system according to claim 7:
wherein said anonymity notification request includes designation information of the communication device, being a monitoring target, anonymity notification destination information, designation information of the communication party, being a notification target of the anonymity, and notification conditions; and
wherein said anonymity notifying means detects an anonymous communication in which the communication device to be designated by said designation information of the communication device, being a monitoring target, participates as the caller device or the callee device, out of the anonymous communications that are being made through the communication session to be established by said anonymous communication establishing means, determines whether or not the above detected anonymous communication satisfies the notification condition within said anonymity notification request, acquires the anonymity of the communication party to be designated by the designation information of the communication party, being a notification target of the anonymity, within said anonymity notification request, out of the communication parties of the caller device and the callee device in said detected anonymous communication, from said anonymity management information when it satisfies the notification condition, and notifies it to the device to be designated by said anonymity notification destination information.

12. An anonymous communication system according to claim 7, wherein said anonymity notifying means inquires of the communication device as to whether the anonymity may be notified to the third party, and judges whether or not the anonymity may be notified based upon a response result thereof.

13. An anonymous communication system according to claim 12, wherein said anonymity notifying means compares attribute information of a user of the communication device, being an inquiry destination, with an pre-set inquiry condition, and judges whether or not the inquiry is required based upon a comparison result thereof.

14. An anonymous communication system according to claim 7, wherein said anonymity notifying means judges whether or not the anonymity may be notified by making a reference to a list of the third party devices to which the anonymity may be notified.

15. An anonymous communication method enabling a communication by anonymity, said anonymous communication method detecting anonymities of communication parties and notifying them to a third party device other than communication devices of the communication parties, the method comprising:

(a) an anonymous communication establishing step in which an anonymous communication establishing means acquires anonymity management information of a caller device and anonymity management information of a callee device from an anonymity managing means for retaining anonymity management information including a real address, an anonymous address and an anonymity of the communication device when having received a communication connection request designating the callee device from the caller device, establishes a communication session between the caller device and the, and decides which address, out of the real address and the anonymous address, should be used as an address of the caller device to be notified to the callee device responding to the anonymity of the caller device to be included in said acquired anonymity management information; and (b) an anonymity notifying step in which an anonymity notifying means acquires the anonymity of at least one of the communication parties of the caller device and the callee device that make the communication through the communication session to be established by said anonymous communication establishing step from the said anonymity management information, and notifies it to the third party device other than the caller device and the callee device.

16. An anonymity notifying apparatus to be installed in an anonymous communication system enabling a communication by anonymity, said anonymity notifying apparatus detecting anonymities of communication parties and notifying them to a third party device other than communication devices of the communication parties, the apparatus comprising:

an anonymity managing means for retaining anonymity management information including a real address, an anonymous address and the anonymity of the communication device;
an anonymous communication establishing means for:
acquiring the anonymity management information of a caller device and the anonymity management information of a callee device from said anonymity managing means when having received a communication connection request designating the callee device from the caller device,
establishing a communication session between the caller device and the callee device, and
deciding which address, out of the real address and the anonymous address, should be used as an address of the caller device to be notified to the callee device responding to the anonymity of the caller device to be included in said acquired anonymity management information;
a notifying means for:
acquiring the anonymity of at least one of the communication parties of the caller device and the callee device that make the communication through the communication session to be established by said anonymous communication establishing means from said anonymity management information, and
notifying it to the third party device other than the caller device and the callee device.

17. A communication device, which constitutes, in an anonymous communication system for comprising: an anonymity managing means for retaining anonymity management information including a real address, an anonymous address and an anonymity of a communication device; an anonymous communication establishing means for acquiring the anonymity management information of a caller device and the anonymity management information of a callee device from said anonymity managing means when having received a communication connection request designating the callee device from the caller device, establishing a communication session between the caller device and the callee device, and deciding which address, out of the real address and the anonymous address, should be used as an address of the caller device to be notified to the callee device responding to the anonymity of the caller device to be included in said acquired anonymity management information; and an anonymity notifying apparatus for acquiring the anonymity of at least one of the communication parties of the caller device and the callee device that make the communication through the communication session to be established by the above anonymous communication establishing means from said anonymity management information, and notifying it to a third party device other than the caller device and the callee device, said third party device, said communication device comprising a means for receiving said notification information to be notified from said anonymity notifying apparatus, and outputting the anonymity to be shown by said notification information in one of a character output form, a voice output form, and a vibration output form, or a plurality of output forms.

18. A computer program product comprising a non-transitory information storage holding instruction information adapted to enable managing unit of a communication apparatus to implement an anonymity notifying apparatus intended to be installed in an anonymous communication system, the implemented anonymity notifying apparatus comprising:

an anonymity managing means for retaining anonymity management information including a real address, an anonymous address and an anonymity of a communication device; and an anonymous communication establishing means for:
acquiring the anonymity management information of a caller device and the anonymity management information of a callee device from said anonymity managing means when having received a communication connection request designating the callee device from the caller device,
establishing a communication session between the caller device and the callee device, and
deciding which address, out of the real address and the anonymous address, should be used as an address of the caller device to be notified to the callee device responding to the anonymity of the caller device to be included in said acquired anonymity management information to function as a notifying means for:
acquiring the anonymity of at least one of the communication parties of the caller device and the callee device that make the communication through the communication session to be established by said anonymous communication establishing means from said anonymity management information, and
notifying it to a third party device other than the caller device and the callee device.

19. A computer program product comprising a non-transitory information storage instruction information adapted to enable managing unit of a communication apparatus to implement a communication device in an anonymous communication system, the implemented communication device comprising:

an anonymity managing means for retaining anonymity management information including a real address, an anonymous address and an anonymity of a communication device; and an anonymous communication establishing means for:
acquiring the anonymity management information of a caller device and the anonymity management information of a callee device from said anonymity managing means when having received a communication connection request designating the callee device from the caller device,
establishing a communication session between the caller device and the callee device, and
deciding which address, out of the real address and the anonymous address, should be used as an address of the caller device to be notified to the callee device responding to the anonymity of the caller device to be included in said acquired anonymity management information; and an anonymity notifying apparatus for
acquiring the anonymity of at least one of the communication parties of the caller device and the callee device making the communication through the communication session to be established by the above anonymous communication establishing means from said anonymity management information, and
notifying it to the third party device other than the caller device and the callee device,
said communication device being said third party device, to function as a means for receiving said notification information to be notified from said anonymity notifying apparatus, and outputting the anonymity to be shown by said notification information in one of a character output form, a voice output form, and a vibration output form, or a plurality of output forms.

* * * * *